United States Patent
Busaba et al.

(10) Patent No.: US 9,229,722 B2
(45) Date of Patent: *Jan. 5, 2016

(54) MAJOR BRANCH INSTRUCTIONS WITH TRANSACTIONAL MEMORY

(75) Inventors: Fadi Y. Busaba, Poughkeepsie, NY (US); Steven R. Carlough, Wappingers Falls, NY (US); Christopher A. Krygowski, Lagrangeville, NY (US); Brian R. Prasky, Wappingers Falls, NY (US); Chung-Lung K. Shum, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 794 days.

This patent is subject to a terminal disclaimer.

(21) Appl. No.: 13/362,513

(22) Filed: Jan. 31, 2012

(65) Prior Publication Data

US 2013/0198491 A1    Aug. 1, 2013

(51) Int. Cl.
*G06F 9/30* (2006.01)
*G06F 9/40* (2006.01)
*G06F 9/46* (2006.01)
*G06F 9/38* (2006.01)
(Continued)

(52) U.S. Cl.
CPC ............ *G06F 9/3804* (2013.01); *G06F 9/3005* (2013.01); *G06F 9/30145* (2013.01); *G06F 9/322* (2013.01); *G06F 9/3842* (2013.01); *G06F 9/3851* (2013.01); *G06F 9/528* (2013.01); *G06F 9/46* (2013.01); *G06F 9/466* (2013.01); *G06F 9/467* (2013.01)

(58) Field of Classification Search
CPC ....... G06F 9/3842; G06F 9/3851; G06F 9/46; G06F 9/466; G06F 9/467
USPC ......................................................... 712/235
See application file for complete search history.

(56) References Cited

U.S. PATENT DOCUMENTS 4,833,599 A    5/1989  Colwell et al.
5,809,294 A    9/1998  Ando
(Continued)

FOREIGN PATENT DOCUMENTS

EP    0725334 A1    7/1996

OTHER PUBLICATIONS

Herlihy et al, "Transactional Memory: Architectural Support for Lock-Free Data Structures", May 1993, Proceeding ISCA '93 Proceedings of the 20th annual international symposium on computer architecture, pp. 289-300.*

(Continued)

*Primary Examiner* — Andrew Caldwell
*Assistant Examiner* — Yuqing Xiao
(74) *Attorney, Agent, or Firm* — Margaret McNamara, Esq.; Blanche E. Schiller, Esq.; Heslin Rothenberg Farley & Mesiti, P.C.

(57) ABSTRACT

Major branch instructions are provided that enable execution of a computer program to branch from one segment of code to another segment of code. These instructions also create a new stream of processing at the other segment of code enabling execution of the other segment of code to be performed in parallel with the segment of code from which the branch was taken. In one example, the other stream of processing starts a transaction for processing instructions of the other stream of processing.

16 Claims, 15 Drawing Sheets

(51) Int. Cl.
*G06F 9/32* (2006.01)
*G06F 9/52* (2006.01)

(56) References Cited

U.S. PATENT DOCUMENTS

| | | | |
|---|---|---|---|
| 5,812,811 A * | 9/1998 | Dubey et al. | 712/216 |
| 6,691,221 B2 | 2/2004 | Joshi et al. | |
| 7,124,282 B2 | 10/2006 | Zandveld et al. | |
| 7,134,124 B2 | 11/2006 | Ohsawa et al. | |
| 7,299,343 B2 | 11/2007 | Kalluri et al. | |
| 7,577,827 B2 | 8/2009 | Hoogerbrugge | |
| 7,877,585 B1 | 1/2011 | Coon et al. | |
| 7,930,695 B2 | 4/2011 | Chaudhry et al. | |
| 8,464,261 B2 * | 6/2013 | Moir et al. | 718/101 |
| 8,473,950 B2 * | 6/2013 | Flood et al. | 718/101 |
| 2002/0147760 A1 * | 10/2002 | Torii | 709/107 |
| 2003/0018826 A1 | 1/2003 | Chaudhry et al. | |
| 2003/0079094 A1 * | 4/2003 | Rajwar et al. | 711/150 |
| 2004/0103410 A1 | 5/2004 | Sakai | |
| 2005/0125645 A1 * | 6/2005 | Rudd et al. | 712/239 |
| 2006/0149944 A1 * | 7/2006 | Eisen et al. | 712/235 |
| 2007/0240158 A1 | 10/2007 | Chaudhry et al. | |
| 2008/0288730 A1 | 11/2008 | Heller, Jr. et al. | |
| 2009/0031310 A1 * | 1/2009 | Lev et al. | 718/101 |
| 2009/0217020 A1 | 8/2009 | Yourst | |
| 2010/0082952 A1 | 4/2010 | Sunayama | |
| 2010/0162247 A1 * | 6/2010 | Welc et al. | 718/101 |
| 2010/0205408 A1 * | 8/2010 | Chung et al. | 712/216 |
| 2010/0269102 A1 * | 10/2010 | Latorre et al. | 717/130 |
| 2011/0246993 A1 | 10/2011 | Moir et al. | |

OTHER PUBLICATIONS

Shen et al., "Modern Processor Design", Oct 2, pp. 457-468.*
International Search Report and Written Opinion for PCT/EP2013/051227 dated Apr. 22, 2013, pp. 1-8.
Mameesh et al., "Speculative-Aware Execution: A Simple and Efficient Technique for Utilizing Multi-Cores to Improve Single-Thread Performance," PACT '10, Sep. 11-15, 2010, pp. 421-430.
Stark, Jared Warner, IV, "Out-of-Order Fetch, Decode, and Issue," University of Michigan, 2000 (no further date information available), pp. 1-282.
Busaba, Fadi Y. et al., "Major Branch Instructions with Transactional Memory," U.S. Appl. No. 13/678,217, dated Nov. 15, 2012, pp. 1-64.
Busaba, Fadi Y. et al., "Major Branch Instructions," U.S. Appl. No. 13/362,574, dated Jan. 31, 2012, pp. 1-69.
Busaba, Fadi Y. et al., "Major Branch Instructions," U.S. Appl. No. 13/678,185, dated Nov. 15, 2012, pp. 1-64.
Office Action for U.S. Appl. No. 13/678,217, dated Oct. 20, 2014, 25 pages.
Office Action for U.S. Appl. No. 13/362,574, dated Nov. 19, 2014, 24 pages.
Oplinger, Jeffrey, "Enhancing Software Reliability with Speculative Threads," Ph.D. Thesis, Aug. 2004, Stanford University, pp. 1-125.
Office Action for U.S. Appl. No. 13/678,185, dated Nov. 26, 2014, 19 pages.
"Intel® 64 and IA-32 Architectures Software Developer's Manual vol. 1," Order No. 253665-022US, Nov. 2006, 486 pages.
"Intel® 64 and IA-32 Architectures Software Developer's Manual vol. 2A," Order No. 253666-022US, Nov. 2006, 744 pages.
"Intel® Itanium® Architecture Software Developer's Manual vol. 1," Doc. No. 245317-005, Jan. 2006, 250 pages.
"Intel® Itanium® Architecture Software Developer's Manual vol. 2," Doc. No. 245318-005, Jan. 2006, 653 pages.
"Intel® Itanium® Architecture Software Developer's Manual vol. 3," Doc. No. 245319-005, Jan. 2006, 986 pages.
"z/Architecture® Principles of Operation," IBM® Publication No. SA22-7932-08, Ninth Edition, Aug. 2010, 1496 pages.
Final Office Action for U.S. Appl. No. 13/678,217 dated Feb. 4, 2015, pp. 1-23.
Final Office Action for U.S. Appl. No. 13/362,574 dated Apr. 13, 2015, pp. 1-27.
Final Office Action for U.S. Appl. No. 13/678,185 dated Apr. 13, 2015, pp. 1-22.

* cited by examiner

MAJOR BRANCH INSTRUCTIONS WITH TRANSACTIONAL MEMORY

BACKGROUND

An aspect of the invention relates, in general, to computer programs, and in particular, to branch instructions used within computer programs.

A computer program (a.k.a., program or application) is a sequence of instructions written to perform a specific task within a computing environment. Each instruction performs a particular operation, such as add, subtract, move, shift, compare, store, and load, to name just a few examples. The instructions are fetched by a processor in sequential order, unless a particular instruction directs the processing to continue at a different location. For instance, instead of fetching the next sequential instruction, a branch instruction may direct the processor to fetch an instruction at a different location in the program. On average, a program has a branch every four to five instructions.

In some computer micro-architectures, an instruction is executed to completion before the next instruction begins. However, in other micro-architectures, pipelining is used to increase the number of instructions that can be concurrently executed. In pipelining, the processing of an instruction is split into a plurality of independent steps, such as fetch, decode, dispatch, issue, execute and complete, as well as potentially others, which are executed in a pipeline. As the first step of the instruction (e.g., fetch) completes in the pipeline, then another instruction may begin, and so forth.

Pipelining also facilitates the execution of instructions out-of-order from their position in the program. For instance, the issue step has associated therewith an issue queue, which receives instructions in-order of the program. The issue queue is responsible for holding each instruction until the data (e.g., operands) needed by the instruction is available, and then it issues the instruction for execution. If the data for one instruction is available prior to the data for another instruction, then the one instruction can be sent out for execution before the other instruction (out-of-order processing), even if the other instruction is first in the program. For example, if instructions A, B and C are to be executed, where A is the oldest and C is the youngest, if B is dependent on A, and C is not dependent on A or B, then the instructions can be issued in the order of A, C, B, thereby utilizing the pipeline at a higher rate and allowing instructions to be processed faster.

The out-of-order processing, however, is constrained by an out-of-order window/queue of a finite size in which instructions may be processed out-of-order. The issue window is typically 100 or less instructions and the reorder window, which re-orders the instructions back into its original order, is typically 200 or less instructions, where the 100 is a subset of the 200.

BRIEF SUMMARY

Shortcomings of the prior art are overcome and advantages are provided through the provision of a computer program product for executing a machine instruction. The computer program product includes a computer readable storage medium readable by a processing circuit and storing instructions for execution by the processing circuit for performing a method. The method includes, for instance, obtaining, by a processor, a machine instruction for execution, the machine instruction being defined for computer execution according to a computer architecture, the machine instruction including: at least one opcode field for specifying an opcode, the opcode defining a branch operation; and at least one field for determining a target location in which to branch; and executing the machine instruction in a first stream of processing, the executing including: starting a second stream of processing, the second stream of processing having a relationship with the first stream of processing; and starting a transaction for the second stream of processing, the transaction to include execution of one or more instructions beginning at the target location defined using the at least one field of the machine instruction, the one or more instructions being out of sequential execution order from one or more instructions being processed by the first stream of processing, the first stream of processing continuing to process one or more instructions subsequent to the machine instruction; and wherein execution of the second stream of processing is speculative in that at least one instruction of the one or more instructions of the second stream of processing is executed even though reaching the at least one instruction of the second stream of processing by processing of the first stream is tentative, and wherein updating of architected state by one or more instructions of the second stream of processing is performed based on the first stream of processing reaching a predefined point in processing.

Methods and systems relating to one or more aspects of the present invention are also described and claimed herein. Further, services relating to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and objects, features, and advantages of one or more aspects of the invention are apparent from the following detailed description taken in conjunction with the accompanying drawings in which:

DETAILED DESCRIPTION

Programs are written in code (e.g., source code), which includes the individual instructions to be executed. There are segments (also referred to as portions, regions, etc.) of code which are not dependent on each other, however, the starting/entry points of these segments are separated by greater than the hardware out-of-order window. Since they are separated, as per the number of executed instructions between the two points, by greater than the out-of-order window, existing branches, referred to herein as minor branches, cannot be reached in a timely manner within the out-of-order window of the first segment to execute instructions of the second segment out-of-order with respect to the first segment. To address this, major branches are provided, in accordance with an aspect of the present invention, to branch from one segment of code to another segment of code to allow a larger out-of-order window than what can be seen by hardware alone (i.e., the amount of code that can be spanned to enter the out-of-order window/queue is larger, although the out-of-order window/queue remains the same physical size (e.g., supporting 100 instructions; the 100 instructions coming from multiple threads of instruction, as discussed below.)).

In accordance with an aspect of the present invention, major branch instructions are provided that enable execution to branch from one segment of code to another segment of code. These instructions create a new stream or thread of execution at the other segment of code enabling execution of the other segment of code to be in parallel with the segment of code from which the branch was taken.

In one example, execution of the new stream is speculative in that it is not known whether processing of the first stream will actually reach the instructions of the new stream (i.e., the first stream reaching the new stream is tentative). It is possible that one or more instructions of the new stream are executed, but processing of the first stream takes a different path and does not reach the new stream.

Figure 1A:
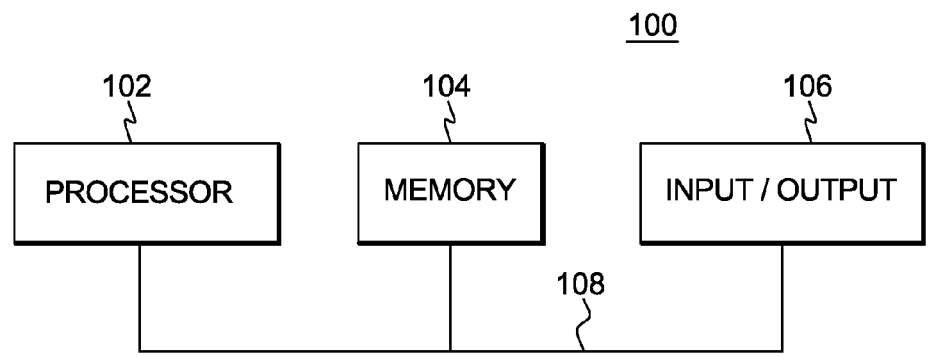
FIG. 1A depicts one embodiment of a computing environment to incorporate and use one or more aspects of the present invention.

One embodiment of a computing environment to incorporate and use one or more aspects of the present invention is described with reference to FIG. 1A. A computing environment 100 includes, for instance, a processor 102 (e.g., a central processing unit), a memory 104 (e.g., main memory), and one or more input/output (I/O) devices and/or interfaces 106 coupled to one another via, for example, one or more buses 108 and/or other connections.

In one example, processor 102 is a z/Architecture® processor which is part of a System z® server offered by International Business Machines Corporation (IBM®), Armonk, N.Y. The System z® server implements the z/Architecture®, offered by International Business Machines Corporation, which specifies the logical structure and functional operation of the computer. One embodiment of the z/Architecture® is described in an IBM® publication entitled, "z/Architecture Principles of Operation," IBM® Publication No. SA22-7832-08, Ninth Edition, August, 2010, which is hereby incorporated herein by reference in its entirety. In one example, the processor executes an operating system, such as z/OS®, also offered by International Business Machines Corporation. IBM®, z/Architecture® and z/OS® are registered trademarks of International Business Machines Corporation, Armonk, N.Y., USA. Other names used herein may be registered trademarks, trademarks, or product names of International Business Machines Corporation or other companies.

Figure 1B:
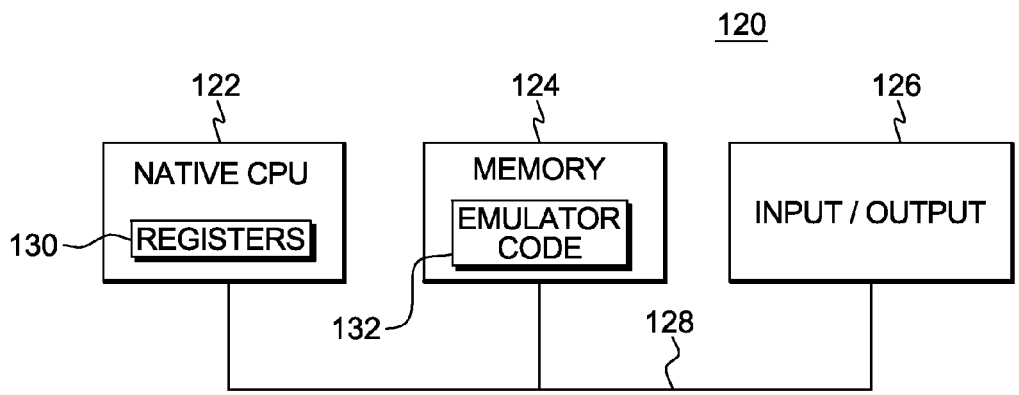
FIG. 1B depicts another embodiment of a computing environment to incorporate and use one or more aspects of the present invention.

Another embodiment of a computing environment to incorporate and use one or more aspects of the present invention is described with reference to FIG. 1B. In this example, a computing environment 120 includes, for instance, a native central processing unit 122, a memory 124, and one or more input/output devices and/or interfaces 126 coupled to one another via, for example, one or more buses 128 and/or other connections. As examples, computing environment 120 may include a PowerPC® processor, a pSeries® server or an xSeries® server offered by International Business Machines Corporation, Armonk, N.Y.; an HP Superdome with Intel Itanium II® processors offered by Hewlett Packard Co., Palo Alto, Calif.; and/or other machines based on architectures offered by IBM®, Hewlett Packard, Intel, Sun Microsystems or others. PowerPC®, pSeries® and xSeries® are registered trademarks of International Business Machines Corporation, Armonk, N.Y., USA. Intel® and Itanium II® are registered trademarks of Intel Corporation, Santa Clara, Calif.

Native central processing unit 122 includes one or more native registers 130, such as one or more general purpose registers and/or one or more special purpose registers used during processing within the environment. These registers include information that represents the state of the environment at any particular point in time.

Moreover, native central processing unit 122 executes instructions and code that are stored in memory 124. In one particular example, the central processing unit executes emulator code 132 stored in memory 124. This code enables the computing environment configured in one architecture to emulate another architecture. For instance, emulator code 132 allows machines based on architectures other than the z/Architecture®, such as PowerPC® processors, pSeries® servers, xSeries® servers, HP Superdome servers or others, to emulate the z/Architecture® and to execute software and instructions developed based on the z/Architecture®.

Figure 1C:
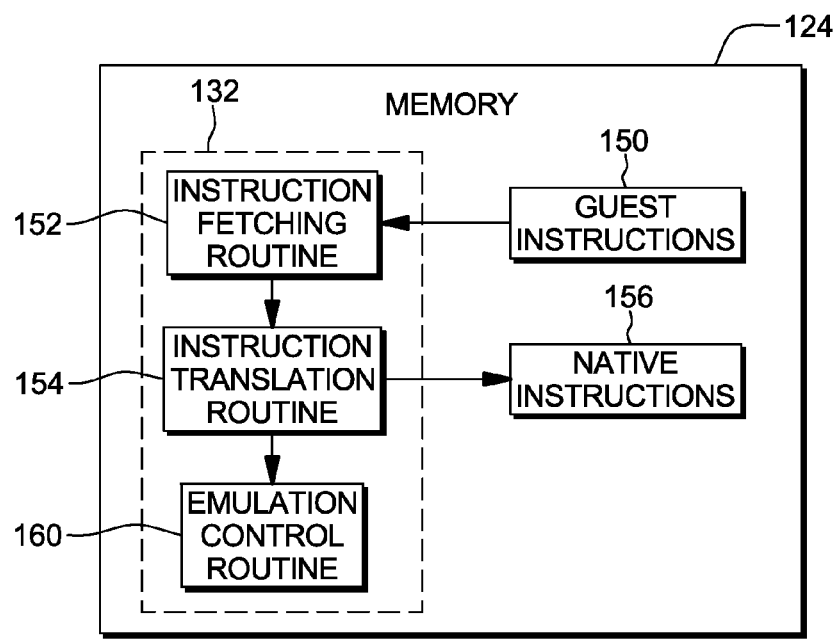
FIG. 1C depicts further details of the memory of FIG. 1B, in accordance with an aspect of the present invention.

Further details relating to emulator code 132 are described with reference to FIG. 1C. Guest instructions 150 comprise software instructions (e.g., machine instructions) that were developed to be executed in an architecture other than that of native CPU 122. For example, guest instructions 150 may have been designed to execute on a z/Architecture® processor 102, but instead are being emulated on native CPU 122 (which may be, for example, an Intel® Itanium II® processor). In one example, emulator code 132 includes an instruction fetching unit 152 to obtain one or more guest instructions 150 from memory 124, and to optionally provide local buffering for the instructions obtained. It also includes an instruction translation routine 154 to determine the type of guest instruction that has been obtained and to translate the guest instruction into one or more corresponding native instructions 156. This translation includes, for instance, identifying the function to be performed by the guest instruction and choosing the native instruction to perform that function.

Further, emulator 132 includes an emulation control routine 160 to cause the native instructions to be executed. Emulation control routine 160 may cause native CPU 122 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 156 may include loading data into a register from memory 124; storing data back to memory from a register; or performing some type of arithmetic or logic operation, as determined by the translation routine.

Each routine is, for instance, implemented in software, which is stored in memory and executed by the native central processing unit 122. In other examples, one or more of the routines or operations are implemented in firmware, hardware, software or some combination thereof. The registers of the emulated processor may be emulated using registers 130 of the native CPU or by using locations in memory 124. In embodiments, the guest instructions 150, native instructions 156 and emulator code 132 may reside in the same memory or may be disbursed among different memory devices.

As used herein, firmware includes, e.g., the microcode, millicode and/or macrocode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

In one example, a guest instruction 150 that is obtained, translated and executed is a branch instruction described herein. The instruction, which is a z/Architecture® instruction in this example, is fetched from memory, translated and represented as a sequence of native instructions 156 (e.g., PowerPC®, pSeries®, xSeries®, Intel®, etc.) which are executed.

In another embodiment, one or more of the instructions are executed in another architecture environment, including, for example, an architecture as described in the "Intel® 64 and IA-32 Architectures Software Developer's Manual Volume 1," Order No. 253665-022US, November 2006; "Intel® 64 and IA-32 Architecture Software Developer's Volume 2A," Order No. 253666-022US, November 2006; the "Intel® Itanium® Architecture Software Developer's Manual Volume 1," Doc. No. 245317-005, January 2006; the "Intel® Itanium® Architecture Software Developer's Manual Volume 2," Doc. No. 245318-005, January 2006; and/or the "Intel® Itanium® Architecture Software Developer's Manual Volume 3," Doc. No. 245319-005, January 2006; each of which is hereby incorporated herein by reference in its entirety.

In one embodiment, a processor can be executed in simultaneous multithreading (SMT) mode or single thread mode. In simultaneous multithreading mode, the processor can simultaneously execute multiple independent threads of execution. A thread, as described in further detail below, may be used in executing one or more instructions of a computer program.

Figure 2A:
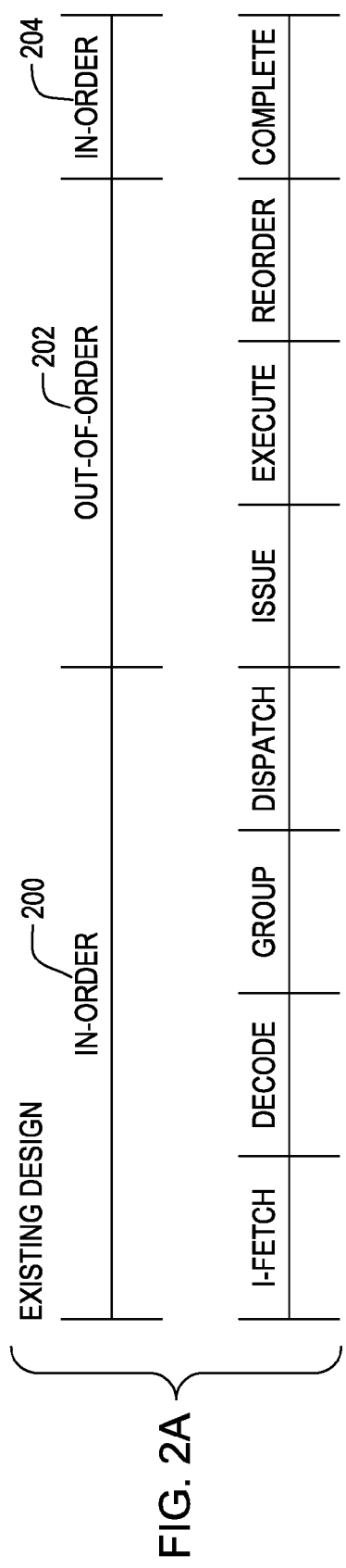
FIG. 2A depicts one example of an existing design of an instruction pipeline.
Figure 2B:
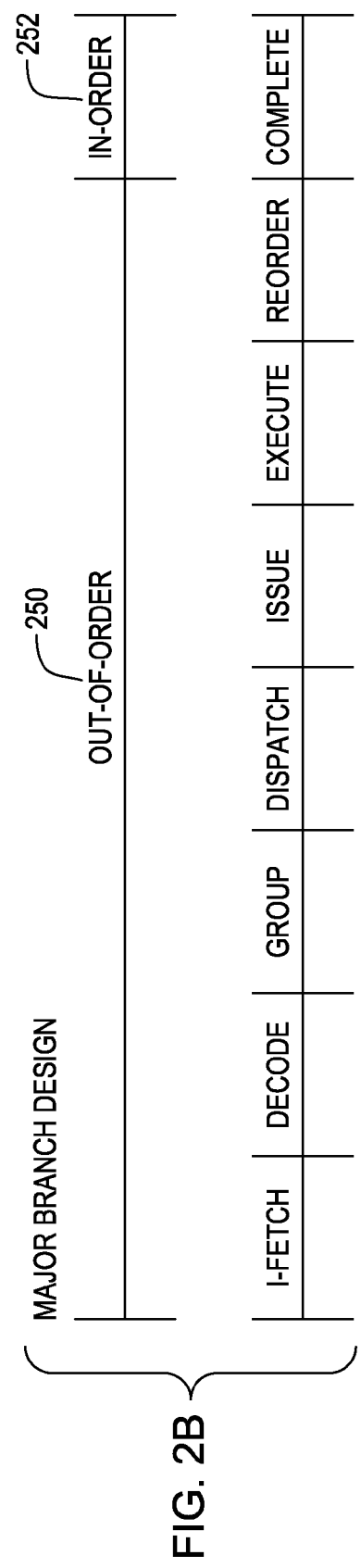
FIG. 2B depicts one example of another design of an instruction pipeline, in accordance with an aspect of the present invention.

As described above, to process the instructions of a computer program, an instruction pipeline is used, examples of which are described with reference to FIGS. 2A-2B. Referring to FIG. 2A, in an existing design, the following steps of each instruction are performed in-order 200: instruction fetch (I-Fetch), instruction decode, group (e.g., grouping of instructions for how they are to be tracked through the pipeline), and instruction dispatch. That is, if Instruction A is first in the program, followed by Instruction B, then fetch, decode, group, and dispatch of Instruction A are performed prior to those steps of Instruction B. However, the steps of Instruction B may be started prior to completion of the steps of Instruction A; e.g., a fetch of Instruction B can commence after a fetch of Instruction A is complete, but before decode of Instruction A is complete. Each of these steps may also work on more than a single instruction in parallel.

The steps of instruction issue, instruction execution and reordering, however, may be performed out-of-order 202. For instance, Instruction B may be executed before Instruction A, but not completed. The completion of the instruction (e.g., checkpointing) is again performed in-order 204, such that, for instance, Instruction A is to complete before Instruction B. One reason to force in-order completion is to allow precise exception detection and reporting for instructions which behave illegally with respect to the architecture.

In accordance with an aspect of the present invention, another design of the instruction pipeline is provided in which more of the processing can be performed out-of-order. For instance, as shown in FIG. 2B, the instruction fetch, decode, group, dispatch, issue, execute and reorder can be performed out-of-order 250, while the complete step is performed in-order 252. This design is used, for instance, in the processing of major branch instructions, as described herein. (Although various instruction steps are described herein, more, less or different steps may be used in other examples.)

One type of branch, referred to herein as a minor branch, defines the next instruction in the program to be executed. This next instruction is not the next instruction in sequential order of the program, but is still part of the processing stream (e.g., thread) currently being executed. Contrasted with minor branches is another type of branch, referred to as major branches, provided in accordance with an aspect of the present invention. A major branch defines a code point (target address) which is not next in sequential program order and will not be part of the processing stream currently being executed, but instead, will be executed as part of a new processing stream (e.g., thread). This type of branch is further described with reference to FIG. 3.

Figure 3:
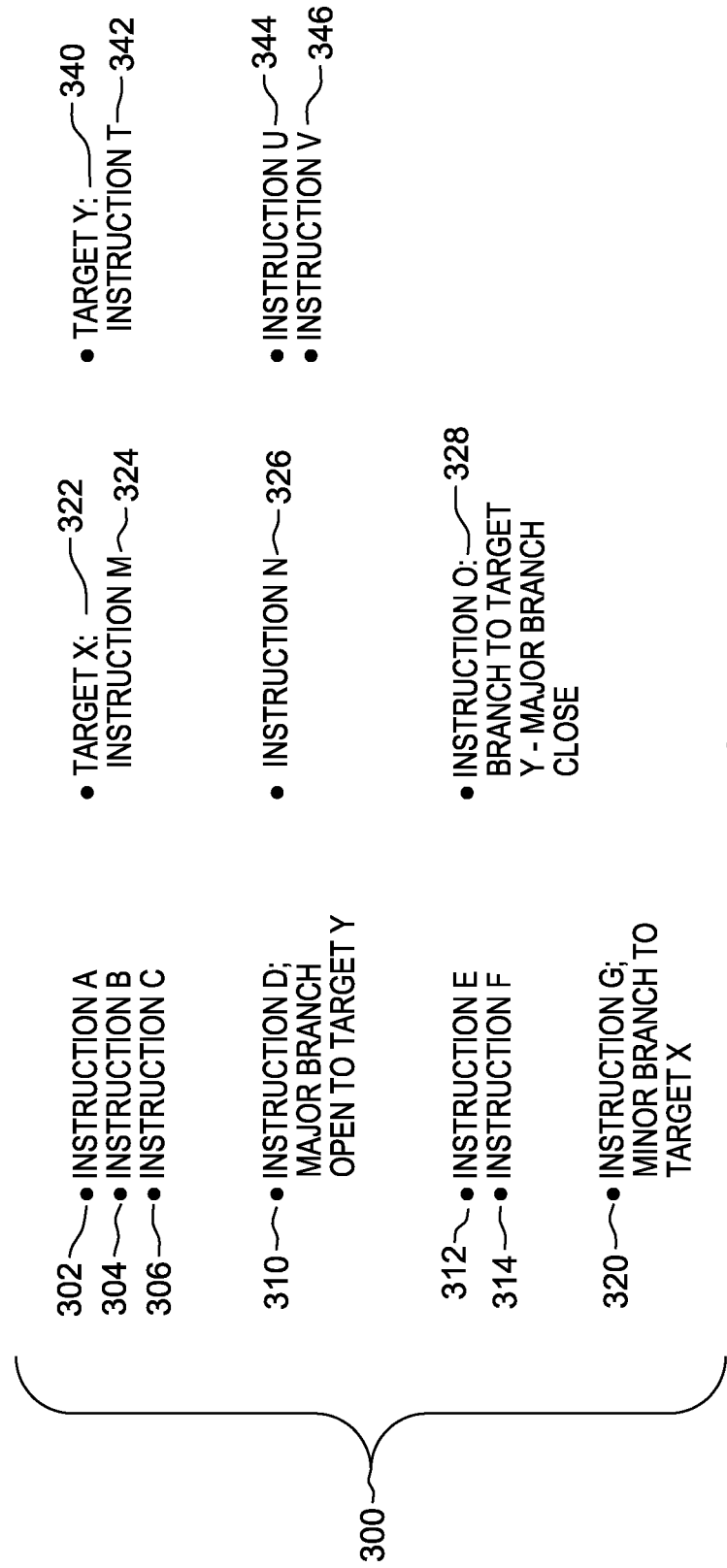
FIG. 3 depicts an example of a portion of a program that includes one or more branches, in accordance with an aspect of the present invention.

Referring to FIG. 3, one example of a computer program 300 (or a portion thereof) is depicted, which includes a plurality of instructions. The first instruction of the computer program is Instruction A 302. Processing begins with Instruction A and proceeds to Instruction B 304, Instruction C 306 and Instruction D 310 in sequential order. In this example, Instruction D is a major branch Open instruction to target Y 340. The major branch Open instruction is executed causing a second stream (referred to herein as a child stream) to be started/opened (for example, a second thread on a SMT processor, referred to herein as a child thread, is activated). The first stream (referred to herein as the parent stream) continues to process Instruction E 312, Instruction F 314 and Instruction G 320. Instruction G branches to Target X 322, at which Instruction M 324 is processed, followed by Instructions N 326 and O 328. These instructions are also processed as part of the first stream, since the branch at Instruction G is a minor branch and does not cause another stream of processing to be started/opened.

In accordance with an aspect of the present invention, the processing of the parent stream (i.e., one or more of Instructions E, F, G, M, N and O) subsequent to the major branch Open is parallel to the processing of the child stream (i.e., one or more of instructions: T 342, U 344, and V 346).

Instruction O, in this example, is a major branch Close instruction, which branches to Target Y 340. The close instruction denotes that the parent thread has caught up to the target address of the major branch OPEN. At this point, the child thread becomes the parent thread, and the thread resources assigned to what was the parent thread are now available for further processing (e.g., as another child thread).

The number of threads available depends on the architecture of the processor. For instance, for an SMT-2 processor, there are two threads available, and therefore, one child (a.k.a., assist) thread can be started. For an SMT-4 processor, there are four threads available, and therefore, three child threads can be started allowing for further out-of-order processing.

In one embodiment, the instructions of the child thread do not complete until the instructions of the parent thread have completed, since instructions are to complete in-order in the example pipeline designs described herein. At the time the instructions of the parent thread checkpoint (e.g., save its state, such as architectural state), the child thread becomes the parent thread and the instructions which were in what was defined as the child thread are now allowed to checkpoint.

In accordance with an aspect of the present invention, any existing or new branch instruction of an instruction set architecture can be defined as a major branch instruction, as well as or in lieu of a minor branch instruction. For instance, many architectures currently have a number of branch instructions that perform various branch operations. Each of these branch instructions (or a subset thereof) can be implemented as a major branch (OPEN/CLOSE) and/or a minor branch instruction. To accomplish this, the opcode or other field of the branch instruction defines the type of the branch instruction as either a major branch (e.g., major branch Open or major branch Close) or a minor branch.

For instance, a branch instruction could have one of three different opcodes: minor branch opcode, major branch Open opcode or major branch Close opcode. Although the three types of branch instructions would have different opcodes, the format of the instruction is the same, as well as the branch operation. The difference lies in how the instruction is processed. For example, its pipeline processing is different, its target address may be different, and its processing as far as being part of the initial thread or another thread depends on the type of branch instruction.

Figure 4A:
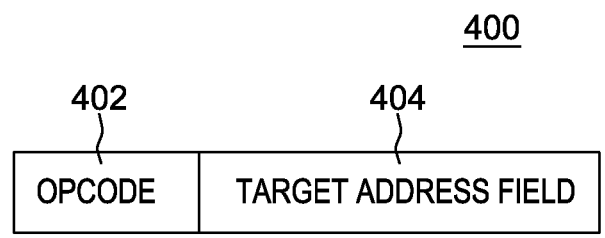
FIG. 4A depicts one example of a format of a generic branch instruction, in accordance with an aspect of the present invention.
Figure 4B:
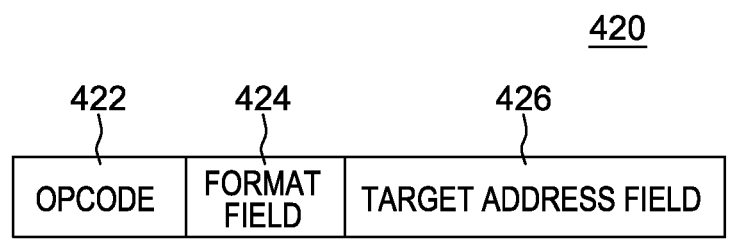
FIG. 4B depicts another example of a format of a generic branch instruction, in accordance with an aspect of the present invention.

In a further example, instead of different opcodes, a field is added to the instruction (e.g., a separate field from the other fields of the instruction or an add-on to one of the existing fields, such as the opcode field or another field) that indicates the type of branch instruction. For instance, a 2-bit field may be used that has the following meaning, in one particular example:

00—Minor branch; instruction behaves as it has
01—Unused
10—Major branch Close
11—Major branch Open Embodiments of formats of a generic branch instruction are depicted in FIGS. 4A-4B. As shown in FIG. 4A, a branch instruction 400 includes at least one opcode field 402 including an opcode indicating the particular branch instruction, as well as the type of branch instruction (major Open, major Close, minor); and a target address field 404 used to determine the location to which the branch instruction is to jump.

In a further example, a branch instruction 420 (FIG. 4B) includes at least one opcode field 422 including an opcode indicating the particular branch instruction, a format field 424 designating the type of branch instruction (e.g., major Open, major Close, minor), and a target address field 426. Format field 424 may be a separate field or part of another field, such as the opcode.

The target address field 404, 426 can be one or more fields used to determine the target location. As examples, it can be a register field that designates a register, the contents of which specify an address of the target location; it can be two fields, such as a base register field and a displacement field, in which the contents of the register designated in the base register field are added to the contents of the displacement field to obtain an address of the target location; or any other combination of fields, registers etc. used to designate the target location.

Further, each individual branch instruction, regardless of whether it is a major or minor branch, may include one or more fields to perform the particular branch operation. As indicated, there can be many branch instructions, examples of which are described in the above-referenced Principles of Operation. For those branch instructions in the Principles of Operation, the particular format of the branch instruction is used, but either the opcode or another field added to the format or appended to an existing field of the instruction indicates the type of branch instruction, e.g., minor, major Open, major Close, in accordance with an aspect of the present invention.

Additional details regarding the processing of major branch instructions are described with reference to FIG. 5. This processing is performed by the processor (e.g., during various pipeline stages) for each thread within an SMT processor (e.g., core).

Figure 5:
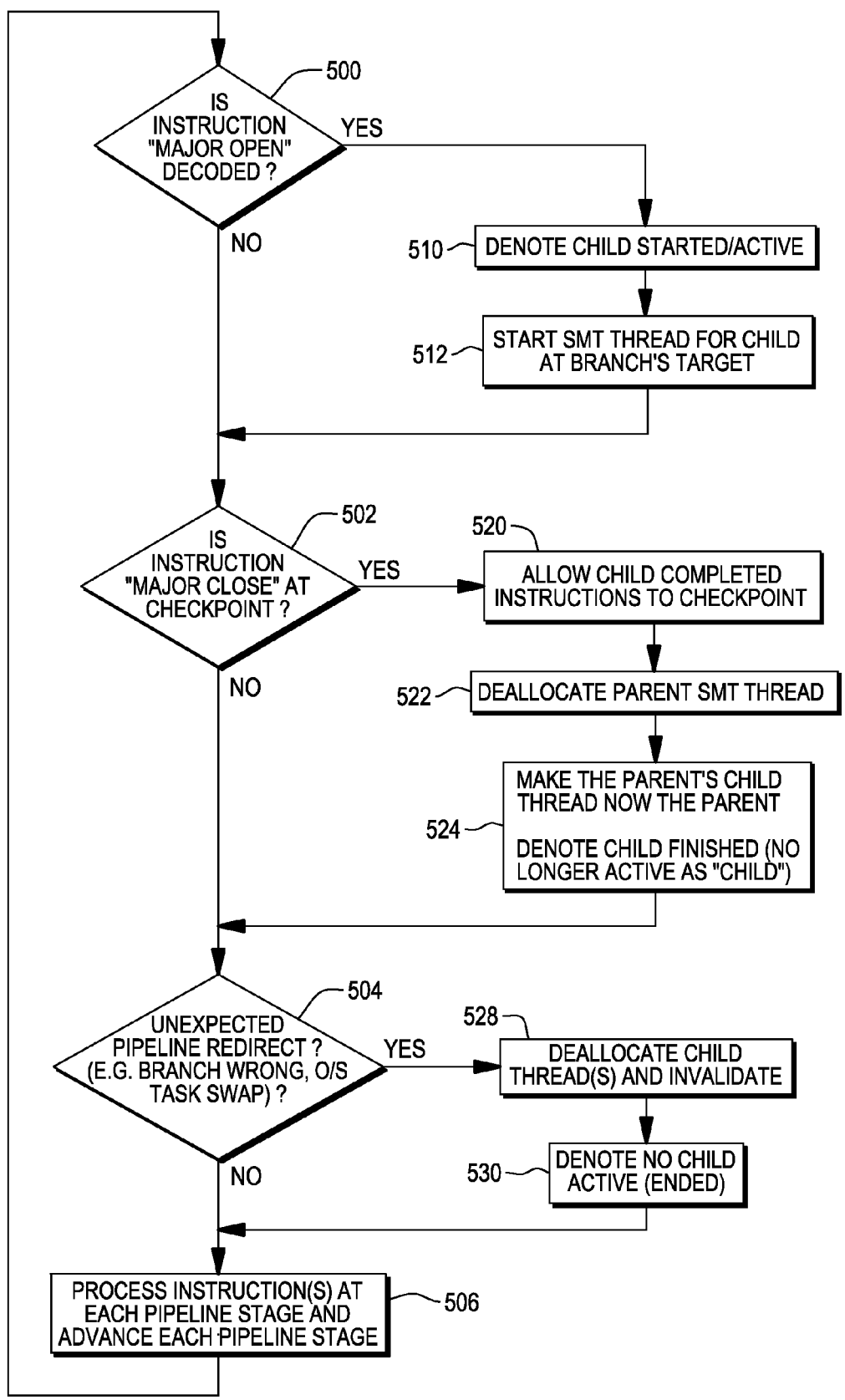
FIG. 5 depicts one example of logic associated with processing major branches, in accordance with an aspect of the present invention.

Referring to FIG. 5, initially, an instruction is fetched and decoded, and an inquiry is made as to whether the instruction is a major branch Open instruction, INQUIRY 500. If the opcode or other field of the instruction indicates it is not a major branch Open instruction, then processing continues to one or more other pipeline stages.

At another pipeline stage, a determination is made as to whether a major branch Close instruction is at checkpoint (i.e., complete step), INQUIRY 502. If not, then processing continues to one or more other pipeline stages, and during such processing, a further inquiry is made as to whether an unexpected pipeline redirect (e.g., branch wrong, operating system task swap) is being experienced, INQUIRY 504. If not, then the instruction (or instructions) is (are) processed at each pipeline stage and then advanced to the next stage, STEP 506. Processing continues to the next instruction.

Returning to INQUIRY 500, if it is a major branch Open instruction, then a second stream (e.g., child thread) is denoted as started/active, STEP 510. In one example, this includes tracking (e.g., by a counter) that another thread of the pre-defined number of threads is being used. Further, a second stream (e.g., SMT thread for the child) is started at the branch's target, STEP 512. In one example, this includes setting a pointer or other indication to use the child thread, as well as starting, in one example, instruction fetch and branch prediction for the child thread. Since this stream or thread is a child of a parent, in this example, the parent's architectural state is referenced by the child. If the child changes an architectural state, then that updated state is associated with just the child. Processing then continues at one or more pipeline stages.

Referring to INQUIRY 502, if it is a major branch Close instruction that has reached checkpoint, then the second stream (e.g., child thread) is allowed to checkpoint one or more instructions of its stream that have completed, STEP 520. The parent stream (e.g., parent SMT thread) is deallocated, such that its resources can be used by another stream or thread, STEP 522. The child stream becomes the parent stream (e.g., by setting a pointer or other indication that it is the parent) in which processing continues where the child thread is processing. The child is considered complete, STEP 524. Processing then continues at one or more other pipeline stages.

Returning to INQUIRY 504, if the parent stream (e.g., thread) encounters a branch wrong or operating system intervention, the child stream is terminated and invalidated, STEP 528. In one example, each child stream can start another child stream via a major branch Open instruction, assuming available threads. Thus, if there are multiple child streams, then each child stream is terminated and invalidated. An indication is made that there is no active child thread, STEP 530, and processing continues at STEP 506. As such, any instructions executed or to be executed by the child stream are now to be processed by the parent stream. Furthermore, upon encountering the associated major Close instruction, it is to be ignored as the close action has already taken place. (In a further embodiment, if there are multiple child streams and one of those child streams encounters a branch wrong, then only the one or more younger child streams are terminated.)

In a further aspect of the present invention, when employing a major branch Open instruction to branch to a target address, the instructions at the target address may be treated as executing within a transaction, in which the results of the instructions are committed as one atomic unit (i.e., all committed or not). In one embodiment, the major branch Open instruction not only starts a new stream or thread, but also starts a transaction via transactional memory. Transactional memory provides the means to state that a given block of code is a transaction. A transaction allows a program to checkpoint instructions at completion; however, upon the start of a transaction, the state of the machine is recorded such that if the transaction does not complete, the machine/processor/pipeline can be restored to the point of the entry of the transaction. All stores are committed to memory at the end of the transaction. This allows the state of the entire system to be able to be restored to the point at which the transaction started. In a transaction, any changes are committed together. If a transaction is abnormally terminated, the processor reverts back to a state prior to starting the transaction. By defining the new child stream as a transaction, the child stream is allowed to perform an architecture checkpoint in parallel with the parent stream; however, the child transaction does not end (TEND) until the child becomes the parent. Should the parent stream encounter a branch wrong, the child stream, which is a transaction, is terminated and the state of the machine is reverted (as defined by the definition of transaction memory) as though no actions in the child stream took place.

In one embodiment, in order for the pipeline to determine that a transaction is to be started via transactional memory with respect to detecting a major branch Open, the architecture is modified. As examples, an opcode (e.g., 402, FIG. 4A) is provided that indicates a branch major Open with transaction; or format field 424, which may be a part of the opcode field or another field or separate therefrom, includes a code that indicates major branch Open with transaction initiated.

In another embodiment, initiation of a transaction for a major branch Open instruction is independent of the architecture and, instead, under control the of hardware pipeline. Hardware control of starting a transaction with respect to major branch Open may initiate a major branch Open as a transaction via transactional memory when such was not specified by the instruction. For example, if the hardware supports nested transactions, then upon detecting a major branch Open instruction, independent of whether the major branch Open instruction format specifies a transaction to be started, one may be started, as directed by the hardware. Furthermore, hardware may allow the processing of major branch Open, but deny the major branch Open from initiating as a transaction, even if such is specified by the architected format of the instruction. For example, if resources for processing transactions are running low in the machine, then while the major branch Open instruction format states to start a transaction, a transaction may be prevented from being started, so as to leave the remaining transactional resources available for any transactions which are already in progress. Other examples also exist.

Further, with a major branch Close instruction, the following actions take place in one embodiment: the parent stream is retired as being an active stream; the child stream becomes the parent stream; and if the major Branch Open started a transaction, what was the child stream is no longer in a transactional memory state and reverts to a classical processor processing state (transaction end). As such, checkpoint content can no longer be rewound to a prior architectural checkpoint state.

One embodiment of the processing associated with a branch instruction with transactional memory is described with reference to FIG. 6. Again, this processing is performed for each thread within an SMT processor and by the logic of the processor processing the branch instruction.

Figure 6:
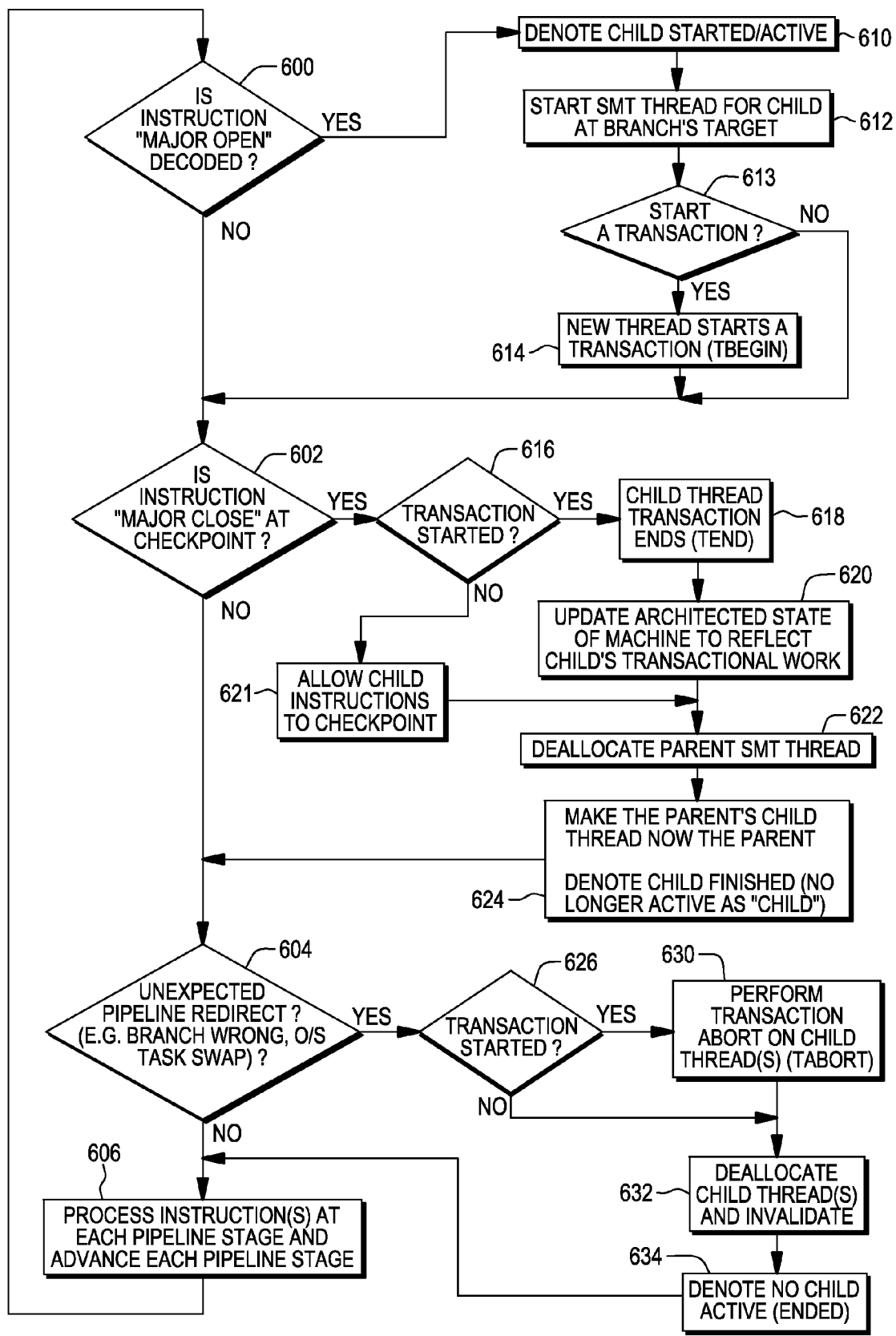
FIG. 6 depicts one example of logic associated with processing major branches with transactional memory, in accordance with an aspect of the present invention.

Referring to FIG. 6, a determination is made as to whether a major branch Open instruction is being decoded, INQUIRY 600. If the opcode or other field of the instruction indicates that a major branch Open instruction is not being decoded, then processing continues to one or more other pipeline stages.

At another pipe stage, a determination is made as to whether a major branch Close instruction is at checkpoint, INQUIRY 602. If the major branch Close instruction is not at checkpoint, then processing continues to one or more other pipeline stages.

A further determination is made as to whether an unexpected pipeline redirect has occurred, INQUIRY 604. If not, the instruction (or instructions) is (are) processed at each pipeline stage and then advanced to the next stage, STEP 606. Processing moves to the next instruction, STEP 600.

Returning to INQUIRY 600, if a major branch Open instruction is being decoded, then it is denoted that another stream (e.g., child thread) is being started/active, STEP 610, and the other stream (e.g., thread) is started at the branch's target, STEP 612. Further, in accordance with an aspect of the invention, a determination is made as to whether a transaction is to be started, INQUIRY 613. As one example, a field of the instruction (either an existing field or a new field) is used to indicate if a transaction is to be started. As another example, the hardware of the processor makes this determination either by overriding the instruction or in lieu of the instruction having such a field that indicates a transaction is to be started. If a transaction is to be started, then the new stream starts a transaction (TBEGIN), STEP 614. For the start of the transaction, a snapshot of the current state of the machine is maintained/taken such that if the transaction is abnormally terminated, the state of the machine can be restored to the point at which the transaction started. Thereafter, or if a transaction is not started, processing continues to one or more other pipeline stages.

Returning to INQUIRY 602, if the logic determines that a major branch Close instruction is at checkpoint, then a determination is made as to whether a transaction was started, INQUIRY 616. If a transaction was started, then the child stream transaction ends (TEND), STEP 618. Further, the architected state of the machine is updated to reflect the child's transactional work, STEP 620. The parent stream (e.g., SMT thread) is deallocated and is no longer active, STEP 622. The child stream is made to be the parent stream and it is noted that the child is no longer active, STEP 624. Processing then continues in the pipeline.

Referring to INQUIRY 616, if a transaction is not started, then any complete child instructions are allowed to checkpoint, STEP 621, and processing continues to STEP 622.

Returning to INQUIRY 604, if an unexpected pipeline redirect has been encountered, then a determination is made as to whether a transaction was started, INQUIRY 626. If a transaction was started, then the child stream's transaction is abnormally terminated (TABORT), STEP 630. Thereafter, or if a transaction was not started, the child stream is deallocated and invalidated, STEP 632; and it is noted that the child is no longer active, STEP 634. In one embodiment, more than one child stream can be in process. If the redirect is encountered on the parent, then all the child streams having any association with the parent are ended, including abnormally terminating the transaction. If the redirect is at a child stream, then any younger child streams are to be ended, including abnormally terminating the transaction. Further, if a child stream encounters an interrupt or exception, the child stream pauses process and resumes process upon becoming the parent stream. Processing continues to STEP 606.

The starting of the child stream(s) in transactional memory allows the child stream(s) to run further ahead. A child stream no longer has to withhold pipelining resources to prevent a hang-up in the parent thread. Further, the child stream is able to retire instructions from the out-of-order completion tables which were limited in size, typically supporting around 200 instructions maximum. In one embodiment, child streams still maintain some limits on the amount of completion that can be performed as a transaction, for resources are required to maintain all of the store data which is to be committed upon completion of the transaction. The hardware to maintain the stores until transaction completion is a lot less restrictive than those resources for the out-of-order windows with respect to, for instance, frequency, latency, capacity, and/or floor plan placement.

Described above is a branch mechanism that enables one segment of code of a program to be processed concurrent to at least one other segment of code of the same program. In one example, a branch instruction is provided that starts a parallel thread (e.g., a child thread) in the taken path, but keeps executing (e.g., parent thread) in the non-taken path. The parent thread includes instructions for either ending the thread or joining the other thread. In one embodiment, the child thread does not update architected state (i.e., state visible to other applications, threads, etc.) until the parent thread reaches a defined point in processing, such as a major branch Close instruction. Further, in one embodiment, the thread of the taken path starts a transactional memory transaction.

The use of major branches allows instructions to be decoded/dispatched out-of-order, so as to provide a larger out-of-order window for instructions to be executed. Without a major branch OPEN/CLOSE, instructions are decoded and dispatched in-order, but may be issued out-of-order, and are completed in-order.

In one embodiment, the amount of processing of the child streams is limited to the out-of-order resources available in the processor. The child streams while using out-of-order resources are not to consume all resources as to create a hang situation such that the parent is unable to obtain resources it needs to make forward progress. This limitation, however, is avoided if the child stream uses transactional processing.

In one embodiment, if a major branch OPEN is encountered and all threads are in use for spanning off child paths, then the major branch OPEN is not executed. This is denoted and upon encountering the paired major branch CLOSE, it is also not executed. By not executing on the CLOSE, a parent to child thread switch will not take place.

In one example, a restart of the parent stream, including a restart of the I-fetch fetching stream, terminates the child stream of processing and any of its children, etc. A restart in a child stream terminates its child and any younger children, but not the parent.

The hardware (e.g., transistors) that define a processor pipeline is made up of many queues. The queues are finite in size, and such queues include, but are not limited to: cache line addresses, instructions to decode (post instruction fetch), instructions to dispatch, instructions from dispatch to architectural checkpoint, general purpose registers, branch queues, and store queues. Without transactional processing, a processor may require a subset or all of these queues to empty in an in-order fashion, even in an out-of-order processor. Those resources (e.g., queues) claimed by a child stream may not be emptied until the parent stream has completed. If the child stream occupies too many resources, then the parent may not have enough resources available to perform the operations of instructions as defined by the architecture and ordered by the software program. It is to prevent such a hang situation that the child may not use resources to the point that there are not enough resources available to the parent for the parent to make forward progress. For the child to be able to limit its resource usage it is to know how much resource is available for it to use. This amount of resource may be either hardwired in the hardware or the parent thread can communicate to the child how much resource is available to be used. Furthermore, the parent may communicate an under-amount of resources that are available for the child to use such that, while the child does not hang the parent, the child does not use so much resource as to bring the parent's rate of forward progress to a crawl.

In a further embodiment, branch prediction is allowed to proceed down a child stream in the manner it would proceed down two independent threads in, for instance, an SMT-2 environment. Branch prediction may be used to predict whether a branch is to be taken and/or the target location of that branch.

As will be appreciated by one skilled in the art, one or more aspects of the present invention may be embodied as a system, method or computer program product. Accordingly, one or more aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, one or more aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 7:
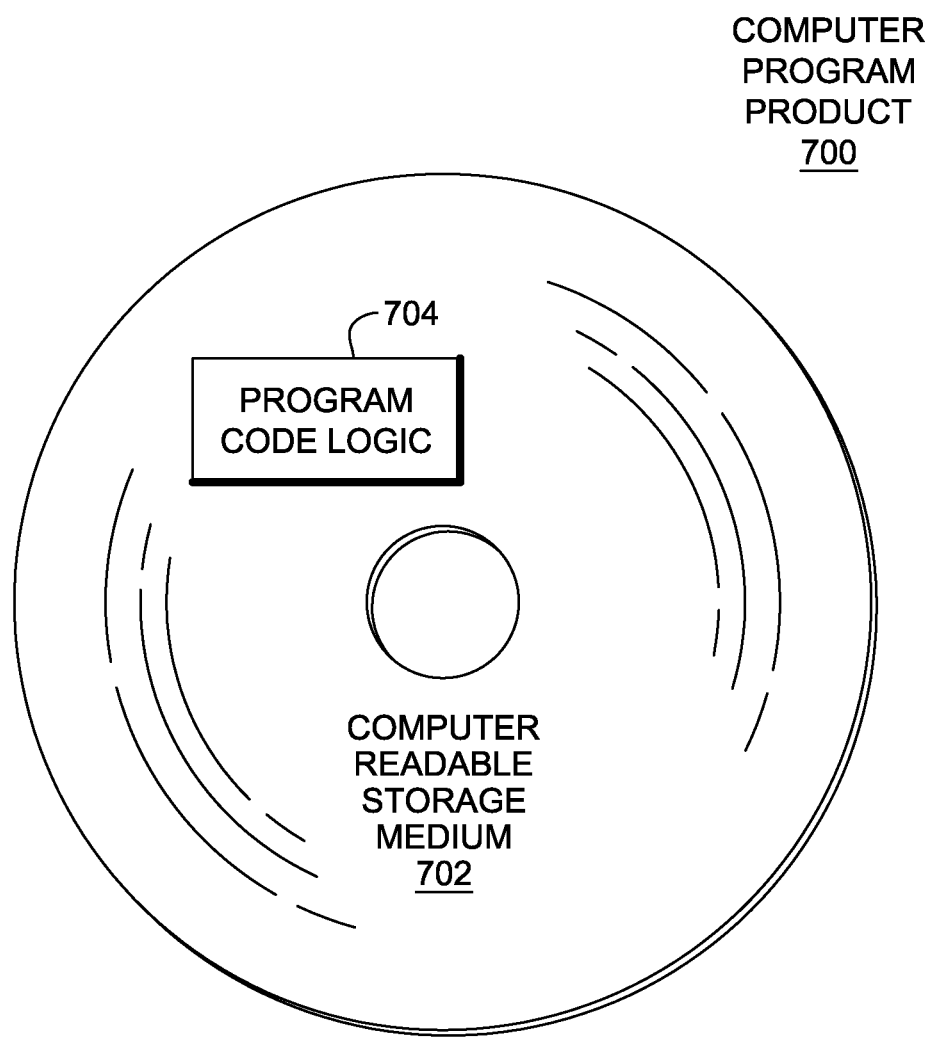
FIG. 7 depicts one embodiment of a computer program product incorporating one or more aspects of the present invention.

Referring now to FIG. 7, in one example, a computer program product 700 includes, for instance, one or more non-transitory computer readable storage media 702 to store computer readable program code means or logic 704 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for one or more aspects of the present invention may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

One or more aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of one or more aspects of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, other computing environments can incorporate and use one or more aspects of the present invention. For instance, a computing environment may include a central processor complex having a plurality of processors. The central processor complex may or may not be logically partitioned. Further, computing environments of other architectures can incorporate and use one or more aspects of the present invention. Additionally, while major branch Open and Close are described, they may be called by different names or additional major branch types may be provided. Many changes and/or additions may be made without departing from the spirit of the present invention.

Further, other types of computing environments can benefit from one or more aspects of the present invention. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

Other examples of computing environments that may incorporate and/or use one or more aspects of the present invention are described below.

Figure 8:
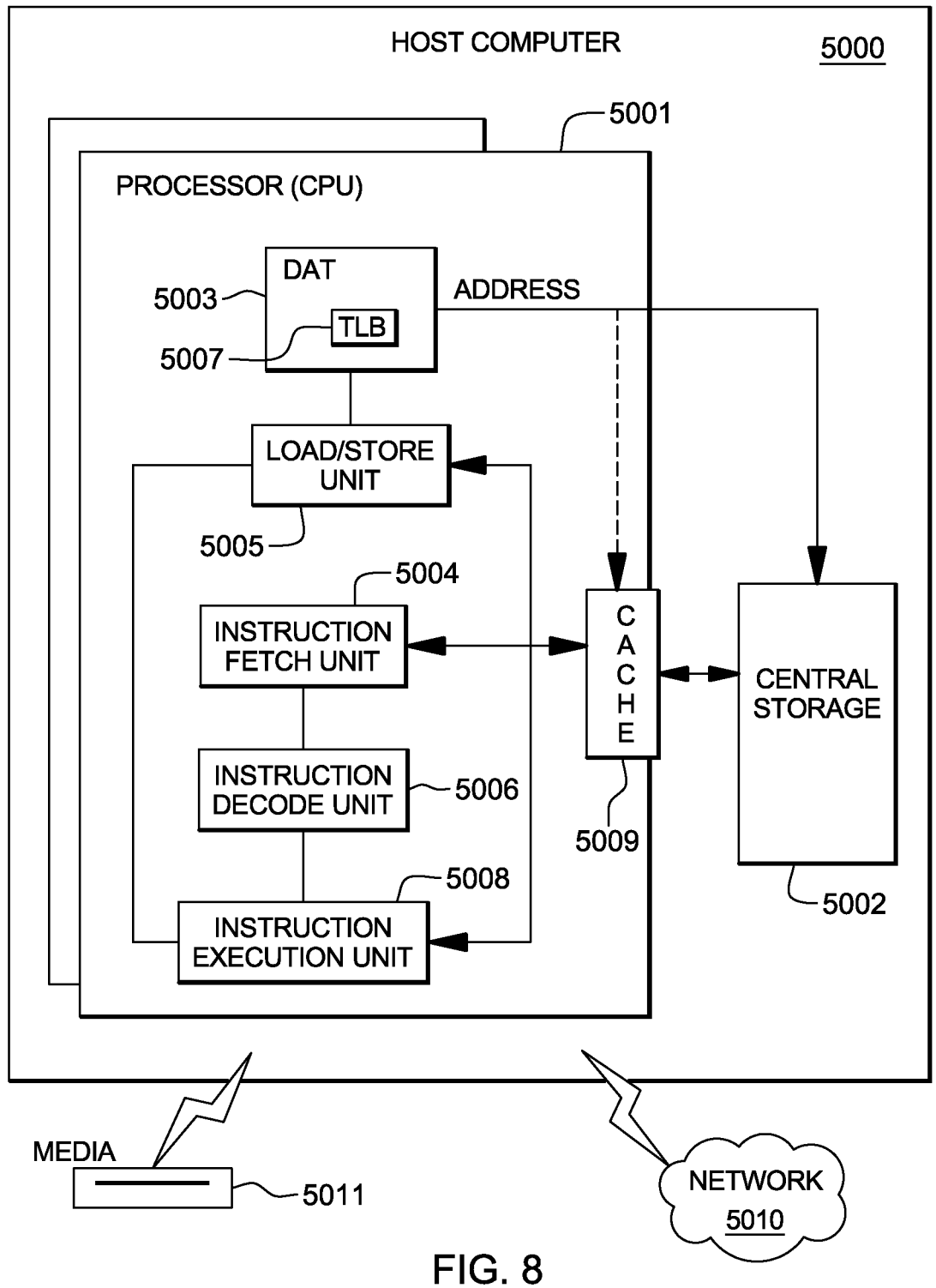
FIG. 8 depicts one embodiment of a host computer system to incorporate and use one or more aspects of the present invention.

Referring to FIG. 8, representative components of a Host Computer system 5000 to implement one or more aspects of the present invention are portrayed. The representative host computer 5000 comprises one or more CPUs 5001 in communication with computer memory (i.e., central storage) 5002, as well as I/O interfaces to storage media devices 5011 and networks 5010 for communicating with other computers or SANs and the like. The CPU 5001 is compliant with an architecture having an architected instruction set and architected functionality. The CPU 5001 may have dynamic address translation (DAT) 5003 for transforming program addresses (virtual addresses) into real addresses of memory. A DAT typically includes a translation lookaside buffer (TLB) 5007 for caching translations so that later accesses to the block of computer memory 5002 do not require the delay of address translation. Typically, a cache 5009 is employed between computer memory 5002 and the processor 5001. The cache 5009 may be hierarchical having a large cache available to more than one CPU and smaller, faster (lower level) caches between the large cache and each CPU. In some implementations, the lower level caches are split to provide separate low level caches for instruction fetching and data accesses. In one embodiment, an instruction is fetched from memory 5002 by an instruction fetch unit 5004 via a cache 5009. The instruction is decoded in an instruction decode unit 5006 and dispatched (with other instructions in some embodiments) to instruction execution unit or units 5008. Typically several execution units 5008 are employed, for example an arithmetic execution unit, a floating point execution unit and a branch instruction execution unit. The instruction is executed by the execution unit, accessing operands from instruction specified registers or memory as needed. If an operand is to be accessed (loaded or stored) from memory 5002, a load/store unit 5005 typically handles the access under control of the instruction being executed. Instructions may be executed in hardware circuits or in internal microcode (firmware) or by a combination of both.

As noted, a computer system includes information in local (or main) storage, as well as addressing, protection, and reference and change recording. Some aspects of addressing include the format of addresses, the concept of address spaces, the various types of addresses, and the manner in which one type of address is translated to another type of address. Some of main storage includes permanently assigned storage locations. Main storage provides the system with directly addressable fast-access storage of data. Both data and programs are to be loaded into main storage (from input devices) before they can be processed.

Main storage may include one or more smaller, faster-access buffer storages, sometimes called caches. A cache is typically physically associated with a CPU or an I/O processor. The effects, except on performance, of the physical construction and use of distinct storage media are generally not observable by the program.

Separate caches may be maintained for instructions and for data operands. Information within a cache is maintained in contiguous bytes on an integral boundary called a cache block or cache line (or line, for short). A model may provide an EXTRACT CACHE ATTRIBUTE instruction which returns the size of a cache line in bytes. A model may also provide PREFETCH DATA and PREFETCH DATA RELATIVE LONG instructions which effects the prefetching of storage into the data or instruction cache or the releasing of data from the cache.

Storage is viewed as a long horizontal string of bits. For most operations, accesses to storage proceed in a left-to-right sequence. The string of bits is subdivided into units of eight bits. An eight-bit unit is called a byte, which is the basic building block of all information formats. Each byte location in storage is identified by a unique nonnegative integer, which is the address of that byte location or, simply, the byte address. Adjacent byte locations have consecutive addresses, starting with 0 on the left and proceeding in a left-to-right sequence. Addresses are unsigned binary integers and are 24, 31, or 64 bits.

Information is transmitted between storage and a CPU or a channel subsystem one byte, or a group of bytes, at a time. Unless otherwise specified, in, for instance, the z/Architecture®, a group of bytes in storage is addressed by the leftmost byte of the group. The number of bytes in the group is either implied or explicitly specified by the operation to be performed. When used in a CPU operation, a group of bytes is called a field. Within each group of bytes, in, for instance, the z/Architecture®, bits are numbered in a left-to-right sequence. In the z/Architecture®, the leftmost bits are sometimes referred to as the "high-order" bits and the rightmost bits as the "low-order" bits. Bit numbers are not storage addresses, however. Only bytes can be addressed. To operate on individual bits of a byte in storage, the entire byte is accessed. The bits in a byte are numbered 0 through 7, from left to right (in, e.g., the z/Architecture). The bits in an address may be numbered 8-31 or 40-63 for 24-bit addresses, or 1-31 or 33-63 for 31-bit addresses; they are numbered 0-63 for 64-bit addresses. Within any other fixed-length format of multiple bytes, the bits making up the format are consecutively numbered starting from 0. For purposes of error detection, and in preferably for correction, one or more check bits may be transmitted with each byte or with a group of bytes. Such check bits are generated automatically by the machine and cannot be directly controlled by the program. Storage capacities are expressed in number of bytes. When the length of a storage-operand field is implied by the operation code of an instruction, the field is said to have a fixed length, which can be one, two, four, eight, or sixteen bytes. Larger fields may be implied for some instructions. When the length of a storage-operand field is not implied but is stated explicitly, the field is said to have a variable length. Variable-length operands can vary in length by increments of one byte (or with some instructions, in multiples of two bytes or other multiples). When information is placed in storage, the contents of only those byte locations are replaced that are included in the designated field, even though the width of the physical path to storage may be greater than the length of the field being stored.

Certain units of information are to be on an integral boundary in storage. A boundary is called integral for a unit of information when its storage address is a multiple of the length of the unit in bytes. Special names are given to fields of 2, 4, 8, and 16 bytes on an integral boundary. A halfword is a group of two consecutive bytes on a two-byte boundary and is the basic building block of instructions. A word is a group of four consecutive bytes on a four-byte boundary. A doubleword is a group of eight consecutive bytes on an eight-byte boundary. A quadword is a group of 16 consecutive bytes on a 16-byte boundary. When storage addresses designate halfwords, words, doublewords, and quadwords, the binary representation of the address contains one, two, three, or four rightmost zero bits, respectively. Instructions are to be on two-byte integral boundaries. The storage operands of most instructions do not have boundary-alignment requirements.

On devices that implement separate caches for instructions and data operands, a significant delay may be experienced if the program stores into a cache line from which instructions are subsequently fetched, regardless of whether the store alters the instructions that are subsequently fetched.

In one embodiment, the invention may be practiced by software (sometimes referred to licensed internal code, firmware, micro-code, milli-code, pico-code and the like, any of which would be consistent with one or more aspects the present invention). Referring to FIG. 8, software program code which embodies one or more aspects of the present invention may be accessed by processor 5001 of the host system 5000 from long-term storage media devices 5011, such as a CD-ROM drive, tape drive or hard drive. The software program code may be embodied on any of a variety of known media for use with a data processing system, such as a diskette, hard drive, or CD-ROM. The code may be distributed on such media, or may be distributed to users from computer memory 5002 or storage of one computer system over a network 5010 to other computer systems for use by users of such other systems.

The software program code includes an operating system which controls the function and interaction of the various computer components and one or more application programs. Program code is normally paged from storage media device 5011 to the relatively higher-speed computer storage 5002 where it is available for processing by processor 5001. The techniques and methods for embodying software program code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

Figure 9:
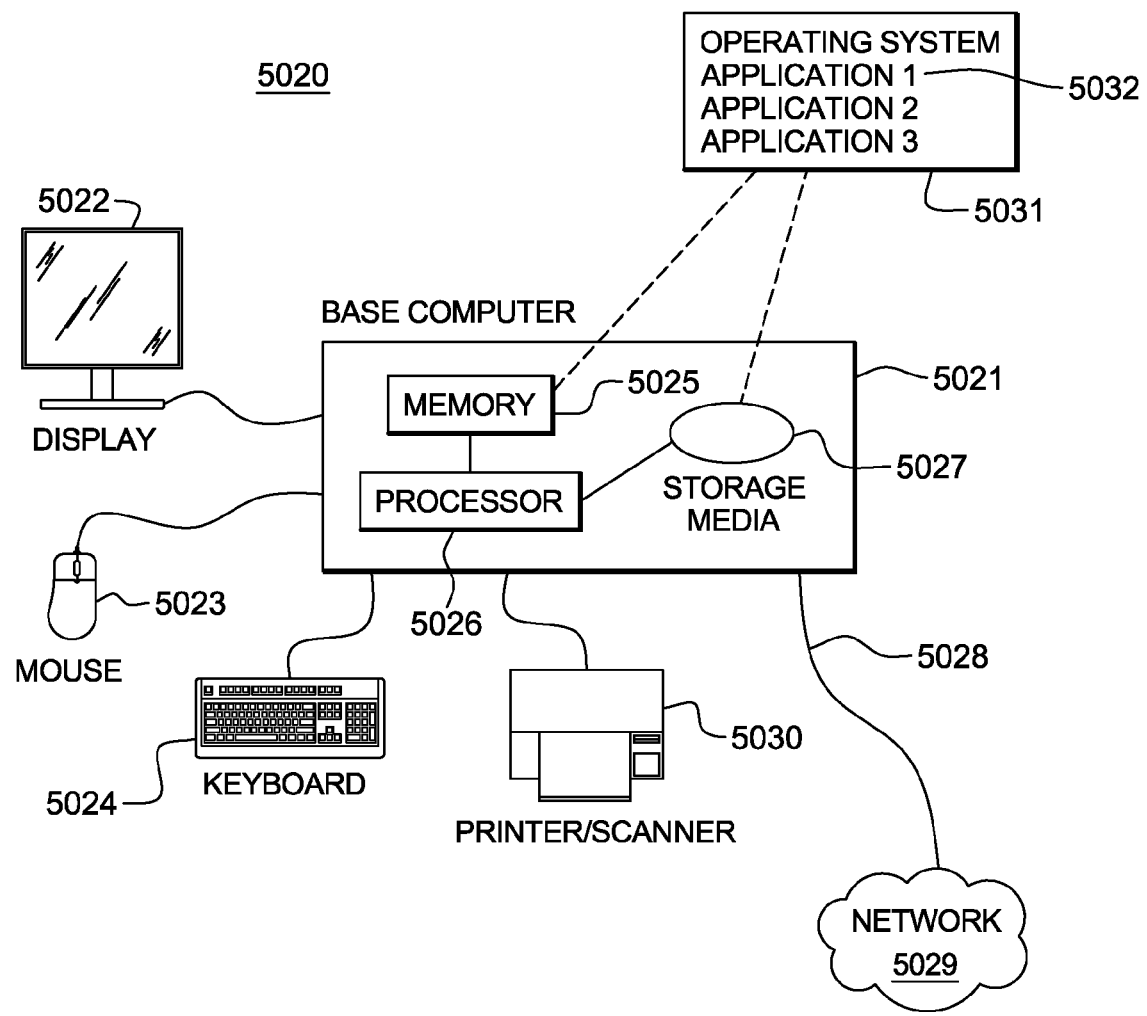
FIG. 9 depicts a further example of a computer system to incorporate and use one or more aspects of the present invention.

FIG. 9 illustrates a representative workstation or server hardware system in which one or more aspects of the present invention may be practiced. The system 5020 of FIG. 9 comprises a representative base computer system 5021, such as a personal computer, a workstation or a server, including optional peripheral devices. The base computer system 5021 includes one or more processors 5026 and a bus employed to connect and enable communication between the processor(s) 5026 and the other components of the system 5021 in accordance with known techniques. The bus connects the processor 5026 to memory 5025 and long-term storage 5027 which can include a hard drive (including any of magnetic media, CD, DVD and Flash Memory for example) or a tape drive for example. The system 5021 might also include a user interface adapter, which connects the microprocessor 5026 via the bus to one or more interface devices, such as a keyboard 5024, a mouse 5023, a printer/scanner 5030 and/or other interface devices, which can be any user interface device, such as a touch sensitive screen, digitized entry pad, etc. The bus also connects a display device 5022, such as an LCD screen or monitor, to the microprocessor 5026 via a display adapter.

The system 5021 may communicate with other computers or networks of computers by way of a network adapter capable of communicating 5028 with a network 5029. Example network adapters are communications channels, token ring, Ethernet or modems. Alternatively, the system 5021 may communicate using a wireless interface, such as a CDPD (cellular digital packet data) card. The system 5021 may be associated with such other computers in a Local Area Network (LAN) or a Wide Area Network (WAN), or the system 5021 can be a client in a client/server arrangement with another computer, etc. All of these configurations, as well as the appropriate communications hardware and software, are known in the art.

Figure 10:
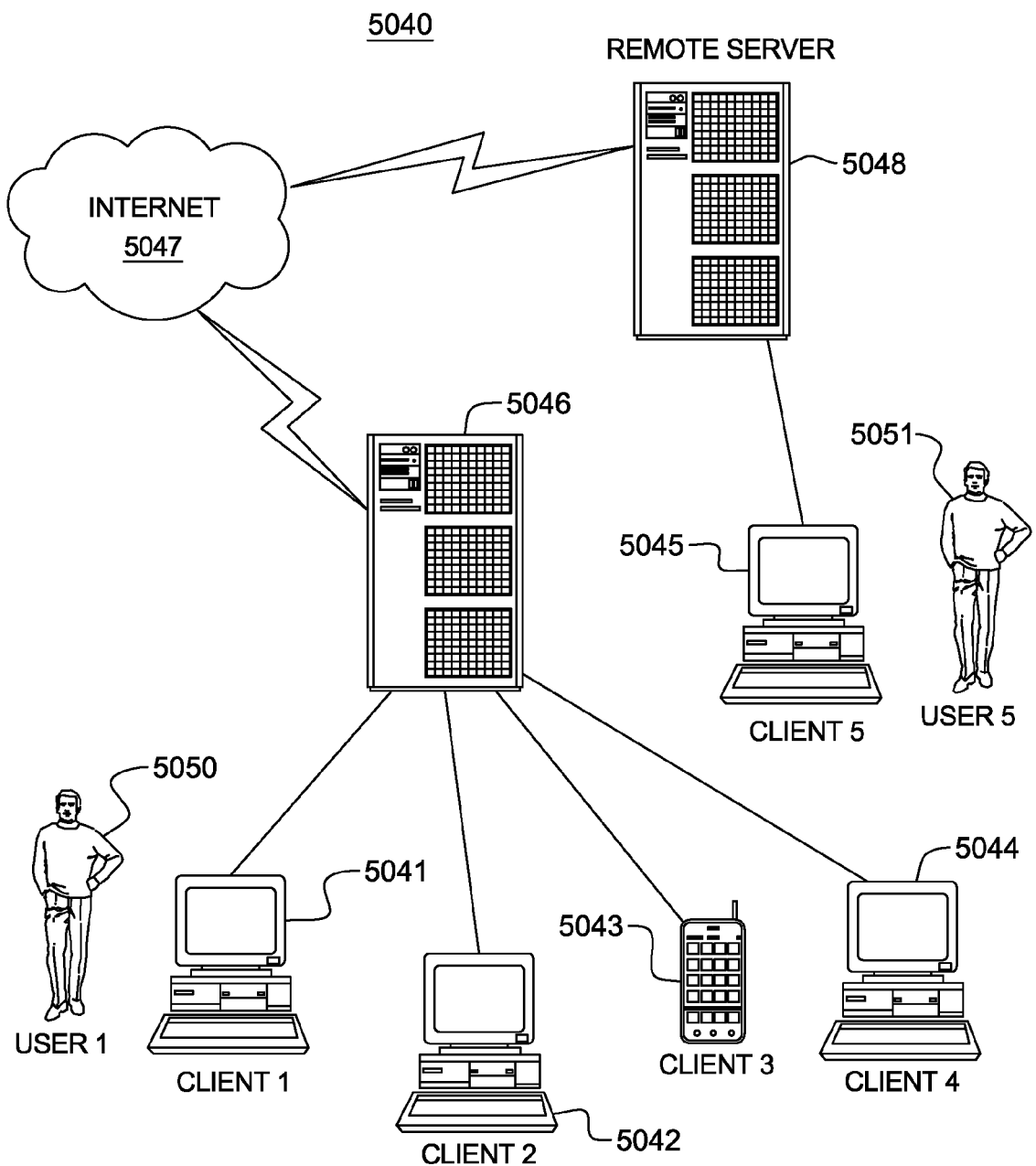
FIG. 10 depicts another example of a computer system comprising a computer network to incorporate and use one or more aspects of the present invention.

FIG. 10 illustrates a data processing network 5040 in which one or more aspects of the present invention may be practiced. The data processing network 5040 may include a plurality of individual networks, such as a wireless network and a wired network, each of which may include a plurality of individual workstations 5041, 5042, 5043, 5044. Additionally, as those skilled in the art will appreciate, one or more LANs may be included, where a LAN may comprise a plurality of intelligent workstations coupled to a host processor.

Still referring to FIG. 10, the networks may also include mainframe computers or servers, such as a gateway computer (client server 5046) or application server (remote server 5048 which may access a data repository and may also be accessed directly from a workstation 5045). A gateway computer 5046 serves as a point of entry into each individual network. A gateway is needed when connecting one networking protocol to another. The gateway 5046 may be preferably coupled to another network (the Internet 5047 for example) by means of a communications link. The gateway 5046 may also be directly coupled to one or more workstations 5041, 5042, 5043, 5044 using a communications link. The gateway computer may be implemented utilizing an IBM eServer™ System z® server available from International Business Machines Corporation.

Referring concurrently to FIG. 9 and FIG. 10, software programming code which may embody one or more aspects of the present invention may be accessed by the processor 5026 of the system 5020 from long-term storage media 5027, such as a CD-ROM drive or hard drive. The software programming code may be embodied on any of a variety of known media for use with a data processing system, such as a diskette, hard drive, or CD-ROM. The code may be distributed on such media, or may be distributed to users 5050, 5051 from the memory or storage of one computer system over a network to other computer systems for use by users of such other systems.

Alternatively, the programming code may be embodied in the memory 5025, and accessed by the processor 5026 using the processor bus. Such programming code includes an operating system which controls the function and interaction of the various computer components and one or more application programs 5032. Program code is normally paged from storage media 5027 to high-speed memory 5025 where it is available for processing by the processor 5026. The techniques and methods for embodying software programming code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

The cache that is most readily available to the processor (normally faster and smaller than other caches of the processor) is the lowest (L1 or level one) cache and main store (main memory) is the highest level cache (L3 if there are 3 levels). The lowest level cache is often divided into an instruction cache (I-Cache) holding machine instructions to be executed and a data cache (D-Cache) holding data operands.

Figure 11:
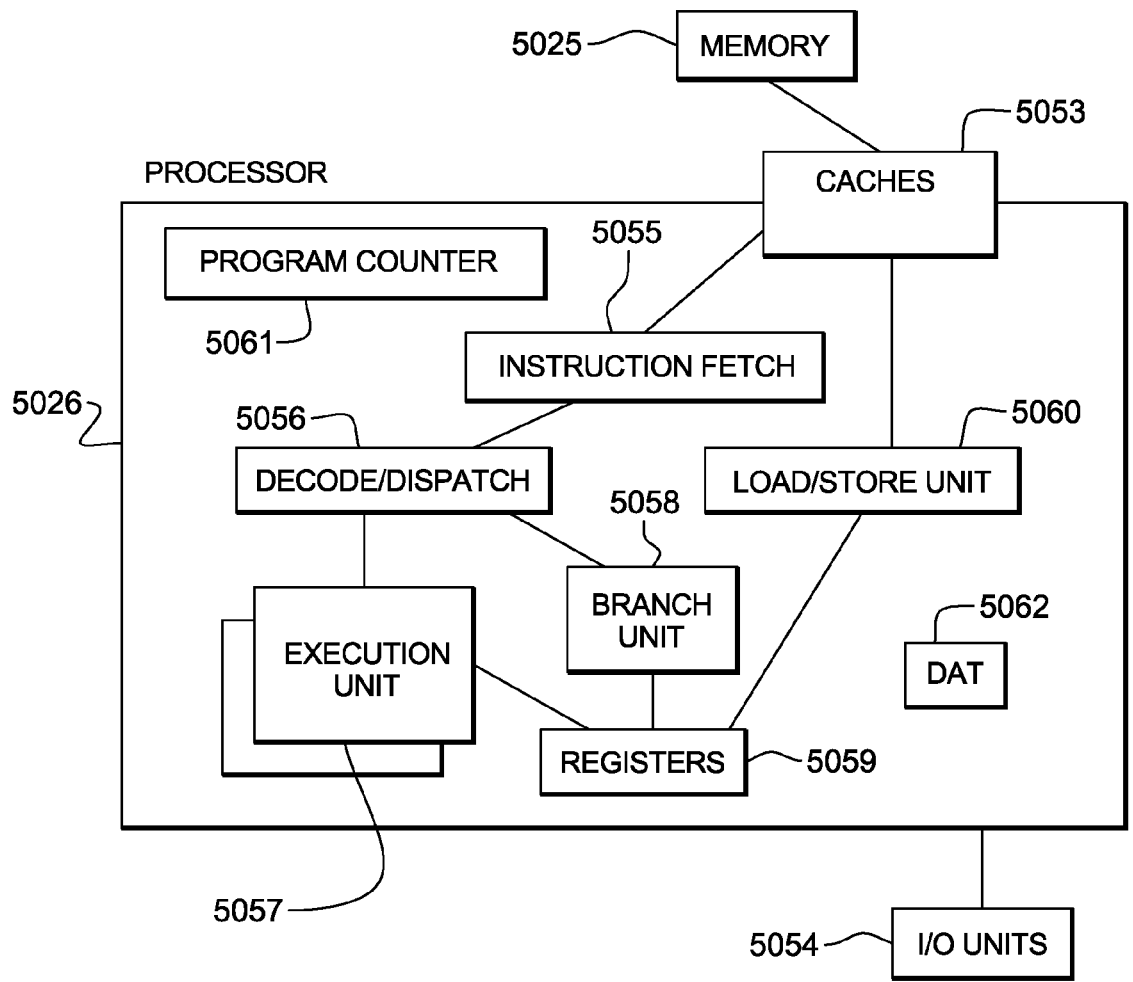
FIG. 11 depicts one embodiment of various elements of a computer system to incorporate and use one or more aspects of the present invention.

Referring to FIG. 11, an exemplary processor embodiment is depicted for processor 5026. Typically one or more levels of cache 5053 are employed to buffer memory blocks in order to improve processor performance. The cache 5053 is a high speed buffer holding cache lines of memory data that are likely to be used. Typical cache lines are 64, 128 or 256 bytes of memory data. Separate caches are often employed for caching instructions than for caching data. Cache coherence (synchronization of copies of lines in memory and the caches) is often provided by various "snoop" algorithms well known in the art. Main memory storage 5025 of a processor system is often referred to as a cache. In a processor system having 4 levels of cache 5053, main storage 5025 is sometimes referred to as the level 5 (L5) cache since it is typically faster and only holds a portion of the non-volatile storage (DASD, tape etc) that is available to a computer system. Main storage 5025 "caches" pages of data paged in and out of the main storage 5025 by the operating system.

A program counter (instruction counter) 5061 keeps track of the address of the current instruction to be executed. A program counter in a z/Architecture® processor is 64 bits and can be truncated to 31 or 24 bits to support prior addressing limits. A program counter is typically embodied in a PSW (program status word) of a computer such that it persists during context switching. Thus, a program in progress, having a program counter value, may be interrupted by, for example, the operating system (context switch from the program environment to the operating system environment). The PSW of the program maintains the program counter value while the program is not active, and the program counter (in the PSW) of the operating system is used while the operating system is executing. Typically, the program counter is incremented by an amount equal to the number of bytes of the current instruction. RISC (Reduced Instruction Set Computing) instructions are typically fixed length while CISC (Complex Instruction Set Computing) instructions are typically variable length. Instructions of the IBM z/Architecture® are CISC instructions having a length of 2, 4 or 6 bytes. The Program counter 5061 is modified by either a context switch operation or a branch taken operation of a branch instruction for example. In a context switch operation, the current program counter value is saved in the program status word along with other state information about the program being executed (such as condition codes), and a new program counter value is loaded pointing to an instruction of a new program module to be executed. A branch taken operation is performed in order to permit the program to make decisions or loop within the program by loading the result of the branch instruction into the program counter 5061.

Typically an instruction fetch unit 5055 is employed to fetch instructions on behalf of the processor 5026. The fetch unit either fetches "next sequential instructions", target instructions of branch taken instructions, or first instructions of a program following a context switch. Modern Instruction fetch units often employ prefetch techniques to speculatively prefetch instructions based on the likelihood that the prefetched instructions might be used. For example, a fetch unit may fetch 16 bytes of instruction that includes the next sequential instruction and additional bytes of further sequential instructions.

The fetched instructions are then executed by the processor 5026. In an embodiment, the fetched instruction(s) are passed to a dispatch unit 5056 of the fetch unit. The dispatch unit decodes the instruction(s) and forwards information about the decoded instruction(s) to appropriate units 5057, 5058, 5060. An execution unit 5057 will typically receive information about decoded arithmetic instructions from the instruction fetch unit 5055 and will perform arithmetic operations on operands according to the opcode of the instruction. Operands are provided to the execution unit 5057 preferably either from memory 5025, architected registers 5059 or from an immediate field of the instruction being executed. Results of the execution, when stored, are stored either in memory 5025, registers 5059 or in other machine hardware (such as control registers, PSW registers and the like).

Figure 12A:
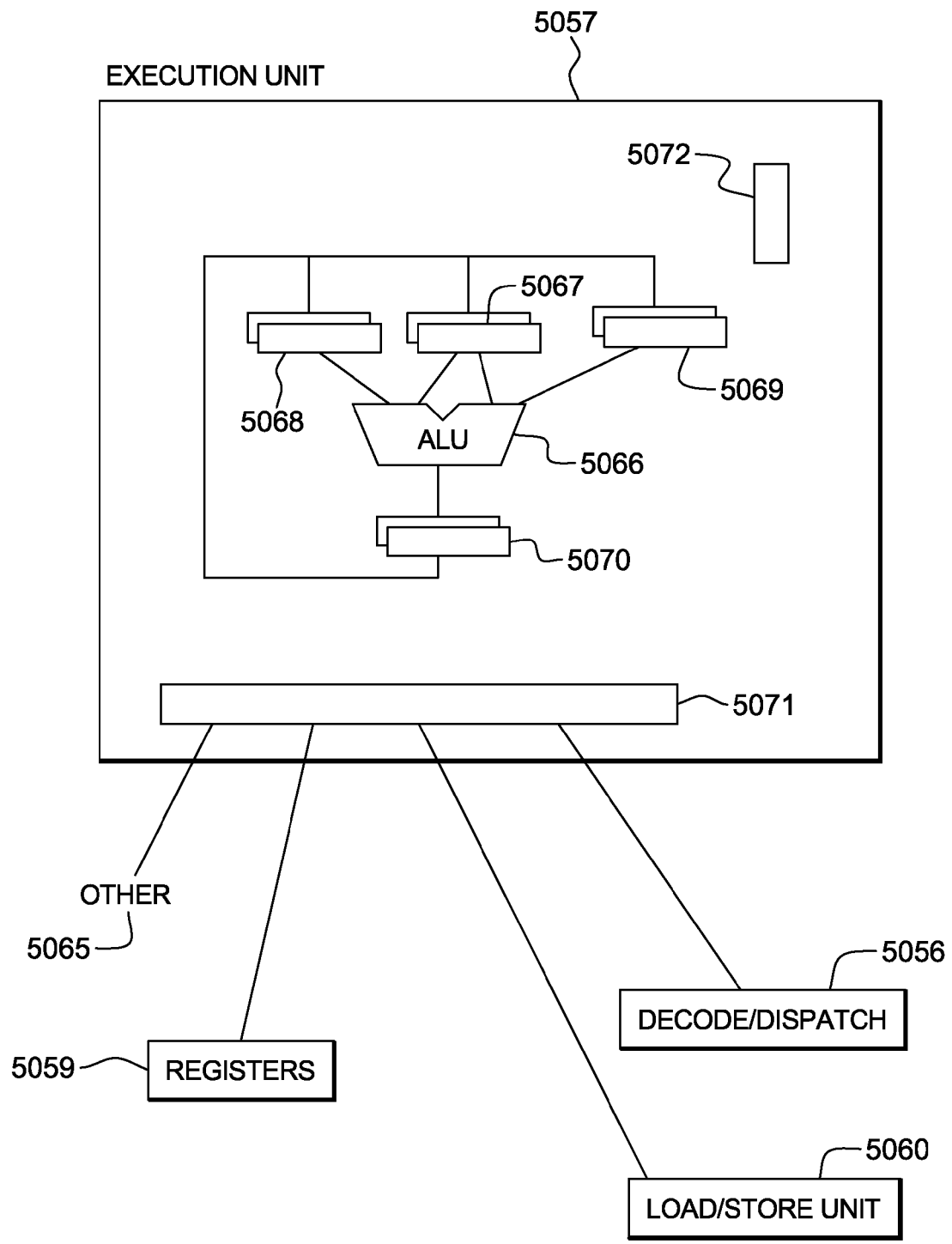
FIG. 12A depicts one embodiment of the execution unit of the computer system of FIG. 11 to incorporate and use one or more aspects of the present invention.

A processor 5026 typically has one or more units 5057, 5058, 5060 for executing the function of the instruction. Referring to FIG. 12A, an execution unit 5057 may communicate with architected general registers 5059, a decode/dispatch unit 5056, a load store unit 5060, and other 5065 processor units by way of interfacing logic 5071. An execution unit 5057 may employ several register circuits 5067, 5068, 5069 to hold information that the arithmetic logic unit (ALU) 5066 will operate on. The ALU performs arithmetic operations such as add, subtract, multiply and divide as well as logical function such as and, or and exclusive-or (XOR), rotate and shift. Preferably the ALU supports specialized operations that are design dependent. Other circuits may provide other architected facilities 5072 including condition codes and recovery support logic for example. Typically the result of an ALU operation is held in an output register circuit 5070 which can forward the result to a variety of other processing functions. There are many arrangements of processor units, the present description is only intended to provide a representative understanding of one embodiment.

An ADD instruction for example would be executed in an execution unit 5057 having arithmetic and logical functionality while a floating point instruction for example would be executed in a floating point execution having specialized floating point capability. Preferably, an execution unit operates on operands identified by an instruction by performing an opcode defined function on the operands. For example, an ADD instruction may be executed by an execution unit 5057 on operands found in two registers 5059 identified by register fields of the instruction.

The execution unit 5057 performs the arithmetic addition on two operands and stores the result in a third operand where the third operand may be a third register or one of the two source registers. The execution unit preferably utilizes an Arithmetic Logic Unit (ALU) 5066 that is capable of performing a variety of logical functions such as Shift, Rotate, And, Or and XOR as well as a variety of algebraic functions including any of add, subtract, multiply, divide. Some ALUs 5066 are designed for scalar operations and some for floating point. Data may be Big Endian (where the least significant byte is at the highest byte address) or Little Endian (where the least significant byte is at the lowest byte address) depending on architecture. The IBM z/Architecture® is Big Endian. Signed fields may be sign and magnitude, 1's complement or 2's complement depending on architecture. A 2's complement number is advantageous in that the ALU does not need to design a subtract capability since either a negative value or a positive value in 2's complement requires only an addition within the ALU. Numbers are commonly described in shorthand, where a 12 bit field defines an address of a 4,096 byte block and is commonly described as a 4 Kbyte (Kilo-byte) block, for example.

Figure 12B:
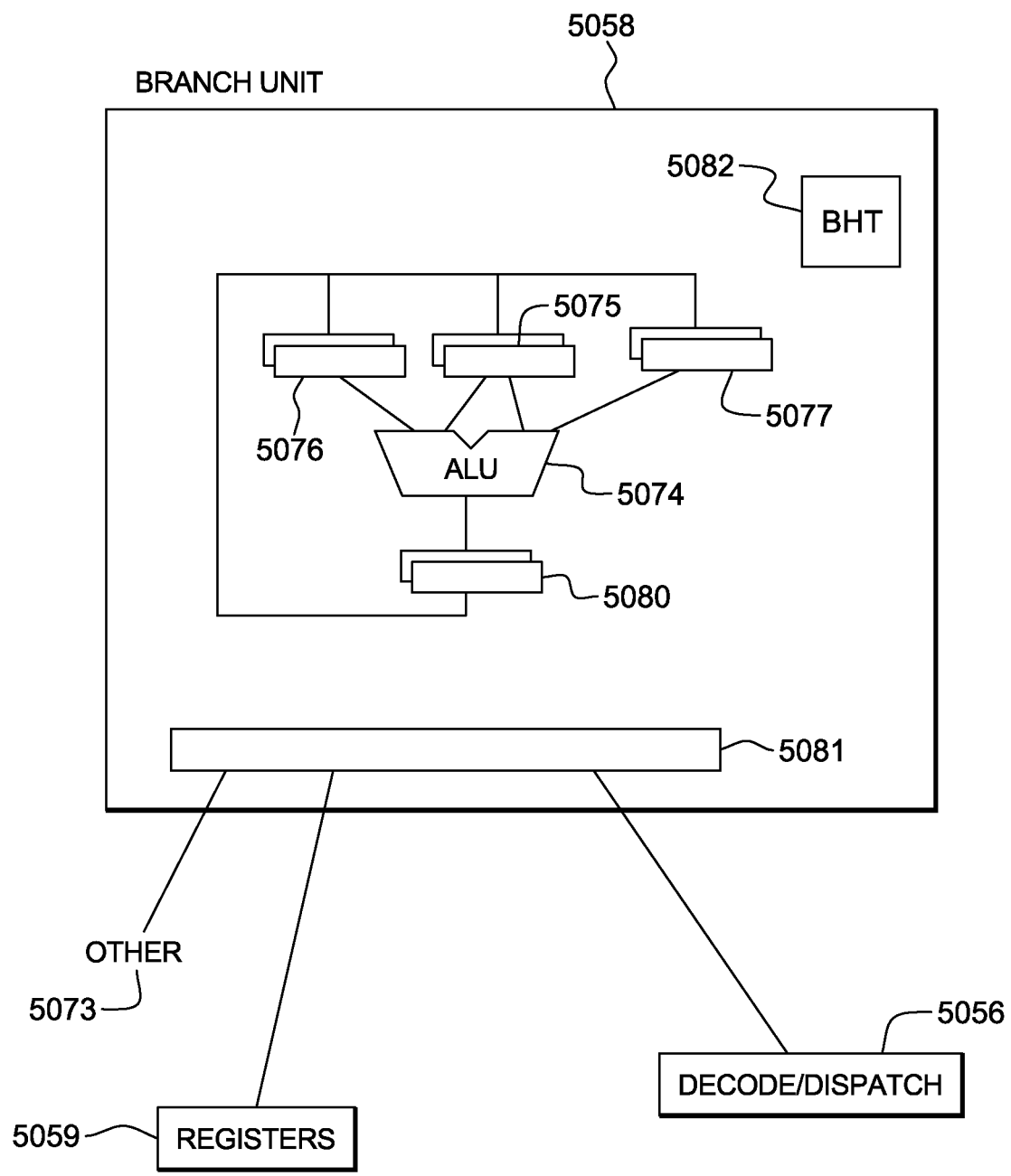
FIG. 12B depicts one embodiment of the branch unit of the computer system of FIG. 11 to incorporate and use one or more aspects of the present invention.

Referring to FIG. 12B, branch instruction information for executing a branch instruction is typically sent to a branch unit 5058 which often employs a branch prediction algorithm such as a branch history table 5082 to predict the outcome of the branch before other conditional operations are complete. The target of the current branch instruction will be fetched and speculatively executed before the conditional operations are complete. When the conditional operations are completed the speculatively executed branch instructions are either completed or discarded based on the conditions of the conditional operation and the speculated outcome. A typical branch instruction may test condition codes and branch to a target address if the condition codes meet the branch requirement of the branch instruction, a target address may be calculated based on several numbers including ones found in register fields or an immediate field of the instruction for example. The branch unit 5058 may employ an ALU 5074 having a plurality of input register circuits 5075, 5076, 5077 and an output register circuit 5080. The branch unit 5058 may communicate with general registers 5059, decode dispatch unit 5056 or other circuits 5073, for example.

The execution of a group of instructions can be interrupted for a variety of reasons including a context switch initiated by an operating system, a program exception or error causing a context switch, an I/O interruption signal causing a context switch or multi-threading activity of a plurality of programs (in a multi-threaded environment), for example. Preferably a context switch action saves state information about a currently executing program and then loads state information about another program being invoked. State information may be saved in hardware registers or in memory for example. State information preferably comprises a program counter value pointing to a next instruction to be executed, condition codes, memory translation information and architected register content. A context switch activity can be exercised by hardware circuits, application programs, operating system programs or firmware code (microcode, pico-code or licensed internal code (LIC)) alone or in combination.

A processor accesses operands according to instruction defined methods. The instruction may provide an immediate operand using the value of a portion of the instruction, may provide one or more register fields explicitly pointing to either general purpose registers or special purpose registers (floating point registers for example). The instruction may utilize implied registers identified by an opcode field as operands. The instruction may utilize memory locations for operands. A memory location of an operand may be provided by a register, an immediate field, or a combination of registers and immediate field as exemplified by the z/Architecture® long displacement facility wherein the instruction defines a base register, an index register and an immediate field (displacement field) that are added together to provide the address of the operand in memory for example. Location herein typically implies a location in main memory (main storage) unless otherwise indicated.

Figure 12C:
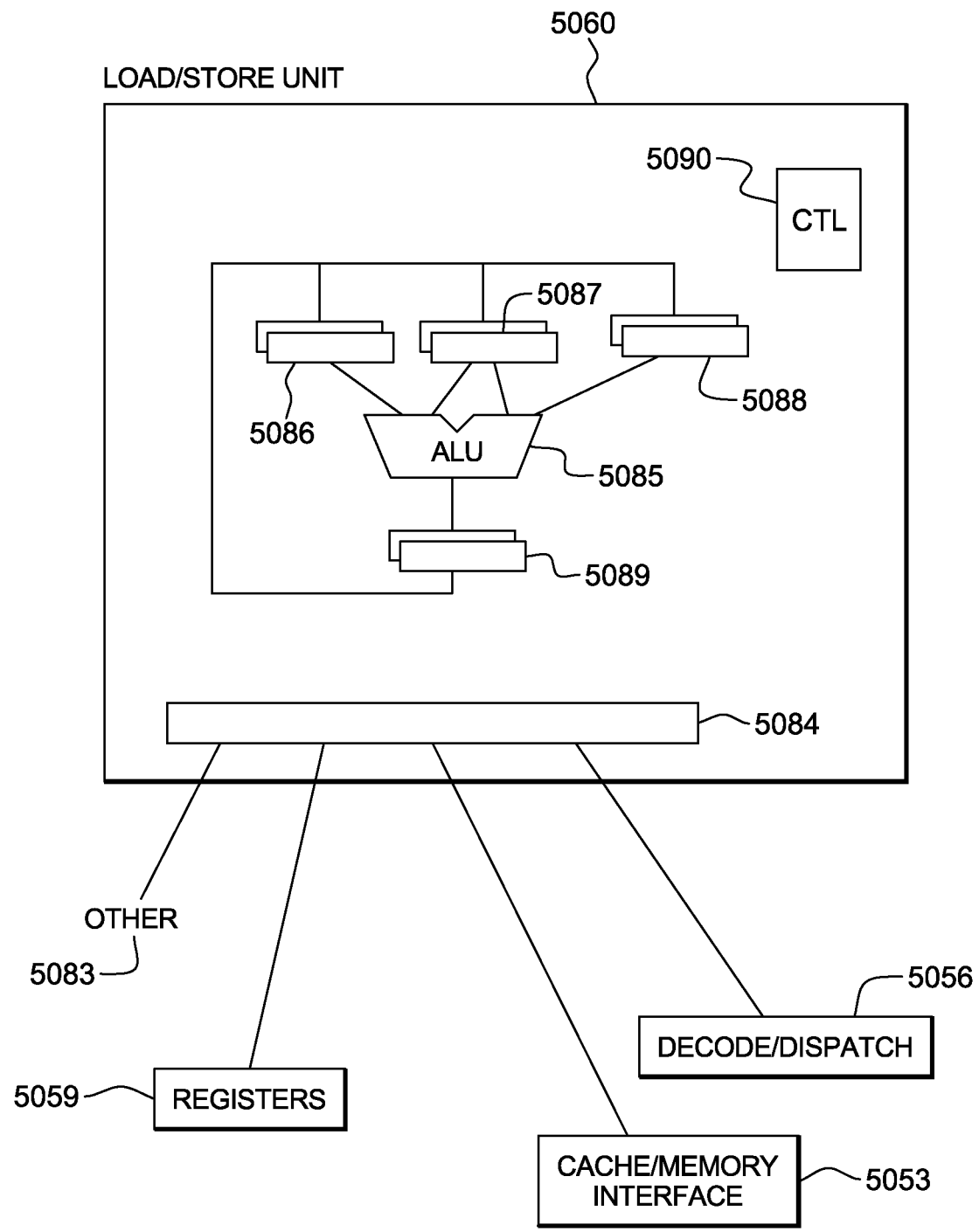
FIG. 12C depicts one embodiment of the load/store unit of the computer system of FIG. 11 to incorporate and use one or more aspects of the present invention.

Referring to FIG. 12C, a processor accesses storage using a load/store unit 5060. The load/store unit 5060 may perform a load operation by obtaining the address of the target operand in memory 5053 and loading the operand in a register 5059 or another memory 5053 location, or may perform a store operation by obtaining the address of the target operand in memory 5053 and storing data obtained from a register 5059 or another memory 5053 location in the target operand location in memory 5053. The load/store unit 5060 may be speculative and may access memory in a sequence that is out-of-order relative to instruction sequence, however the load/store unit 5060 is to maintain the appearance to programs that instructions were executed in order. A load/store unit 5060 may communicate with general registers 5059, decode/dispatch unit 5056, cache/memory interface 5053 or other elements 5083 and comprises various register circuits, ALUs 5085 and control logic 5090 to calculate storage addresses and to provide pipeline sequencing to keep operations in-order. Some operations may be out of order but the load/store unit provides functionality to make the out of order operations to appear to the program as having been performed in order, as is well known in the art.

Preferably addresses that an application program "sees" are often referred to as virtual addresses. Virtual addresses are sometimes referred to as "logical addresses" "effective addresses". These virtual addresses are virtual in that they are redirected to physical memory location by one of a variety of dynamic address translation (DAT) technologies including, but not limited to, simply prefixing a virtual address with an offset value, translating the virtual address via one or more translation tables, the translation tables preferably comprising at least a segment table and a page table alone or in combination, preferably, the segment table having an entry pointing to the page table. In the z/Architecture®, a hierarchy of translation is provided including a region first table, a region second table, a region third table, a segment table and an optional page table. The performance of the address translation is often improved by utilizing a translation lookaside buffer (TLB) which comprises entries mapping a virtual address to an associated physical memory location. The entries are created when the DAT translates a virtual address using the translation tables. Subsequent use of the virtual address can then utilize the entry of the fast TLB rather than the slow sequential translation table accesses. TLB content may be managed by a variety of replacement algorithms including LRU (Least Recently used).

In the case where the processor is a processor of a multi-processor system, each processor has responsibility to keep shared resources, such as I/O, caches, TLBs and memory, interlocked for coherency. Typically, "snoop" technologies will be utilized in maintaining cache coherency. In a snoop environment, each cache line may be marked as being in any one of a shared state, an exclusive state, a changed state, an invalid state and the like in order to facilitate sharing.

I/O units 5054 (FIG. 11) provide the processor with means for attaching to peripheral devices including tape, disc, printers, displays, and networks for example. I/O units are often presented to the computer program by software drivers. In mainframes, such as the System z® from IBM®, channel adapters and open system adapters are I/O units of the mainframe that provide the communications between the operating system and peripheral devices.

Further, other types of computing environments can benefit from one or more aspects of the present invention. As an example, as mentioned herein, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

More particularly, in a mainframe, architected machine instructions are used by programmers, usually today "C" programmers, often by way of a compiler application. These instructions stored in the storage medium may be executed natively in a z/Architecture® IBM® Server, or alternatively in machines executing other architectures. They can be emulated in the existing and in future IBM® mainframe servers and on other machines of IBM® (e.g., Power Systems servers and System x® Servers). They can be executed in machines running Linux on a wide variety of machines using hardware manufactured by IBM®, Intel®, AMD™, and others. Besides execution on that hardware under a z/Architecture®, Linux can be used as well as machines which use emulation by Hercules, UMX, or FSI (Fundamental Software, Inc), where generally execution is in an emulation mode. In emulation mode, emulation software is executed by a native processor to emulate the architecture of an emulated processor.

The native processor typically executes emulation software comprising either firmware or a native operating system to perform emulation of the emulated processor. The emulation software is responsible for fetching and executing instructions of the emulated processor architecture. The emulation software maintains an emulated program counter to keep track of instruction boundaries. The emulation software may fetch one or more emulated machine instructions at a time and convert the one or more emulated machine instructions to a corresponding group of native machine instructions for execution by the native processor. These converted instructions may be cached such that a faster conversion can be accomplished. Notwithstanding, the emulation software is to maintain the architecture rules of the emulated processor architecture so as to assure operating systems and applications written for the emulated processor operate correctly. Furthermore, the emulation software is to provide resources identified by the emulated processor architecture including, but not limited to, control registers, general purpose registers, floating point registers, dynamic address translation function including segment tables and page tables for example, interrupt mechanisms, context switch mechanisms, Time of Day (TOD) clocks and architected interfaces to I/O subsystems such that an operating system or an application program designed to run on the emulated processor, can be run on the native processor having the emulation software.

A specific instruction being emulated is decoded, and a subroutine is called to perform the function of the individual instruction. An emulation software function emulating a function of an emulated processor is implemented, for example, in a "C" subroutine or driver, or some other method of providing a driver for the specific hardware as will be within the skill of those in the art after understanding the description of the preferred embodiment. Various software and hardware emulation patents including, but not limited to U.S. Pat. No. 5,551,013, entitled "Multiprocessor for Hardware Emulation", by Beausoleil et al.; and U.S. Pat. No. 6,009,261, entitled "Preprocessing of Stored Target Routines for Emulating Incompatible Instructions on a Target Processor", by Scalzi et al; and U.S. Pat. No. 5,574,873, entitled "Decoding Guest Instruction to Directly Access Emulation Routines that Emulate the Guest Instructions", by Davidian et al; and U.S. Pat. No. 6,308,255, entitled "Symmetrical Multiprocessing Bus and Chipset Used for Coprocessor Support Allowing Non-Native Code to Run in a System", by Gorishek et al; and U.S. Pat. No. 6,463,582, entitled "Dynamic Optimizing Object Code Translator for Architecture Emulation and Dynamic Optimizing Object Code Translation Method", by Lethin et al; and U.S. Pat. No. 5,790,825, entitled "Method for Emulating Guest Instructions on a Host Computer Through Dynamic Recompilation of Host Instructions", by Eric Traut, each of which is hereby incorporated herein by reference in its entirety; and many others, illustrate a variety of known ways to achieve emulation of an instruction format architected for a different machine for a target machine available to those skilled in the art.

Figure 13:
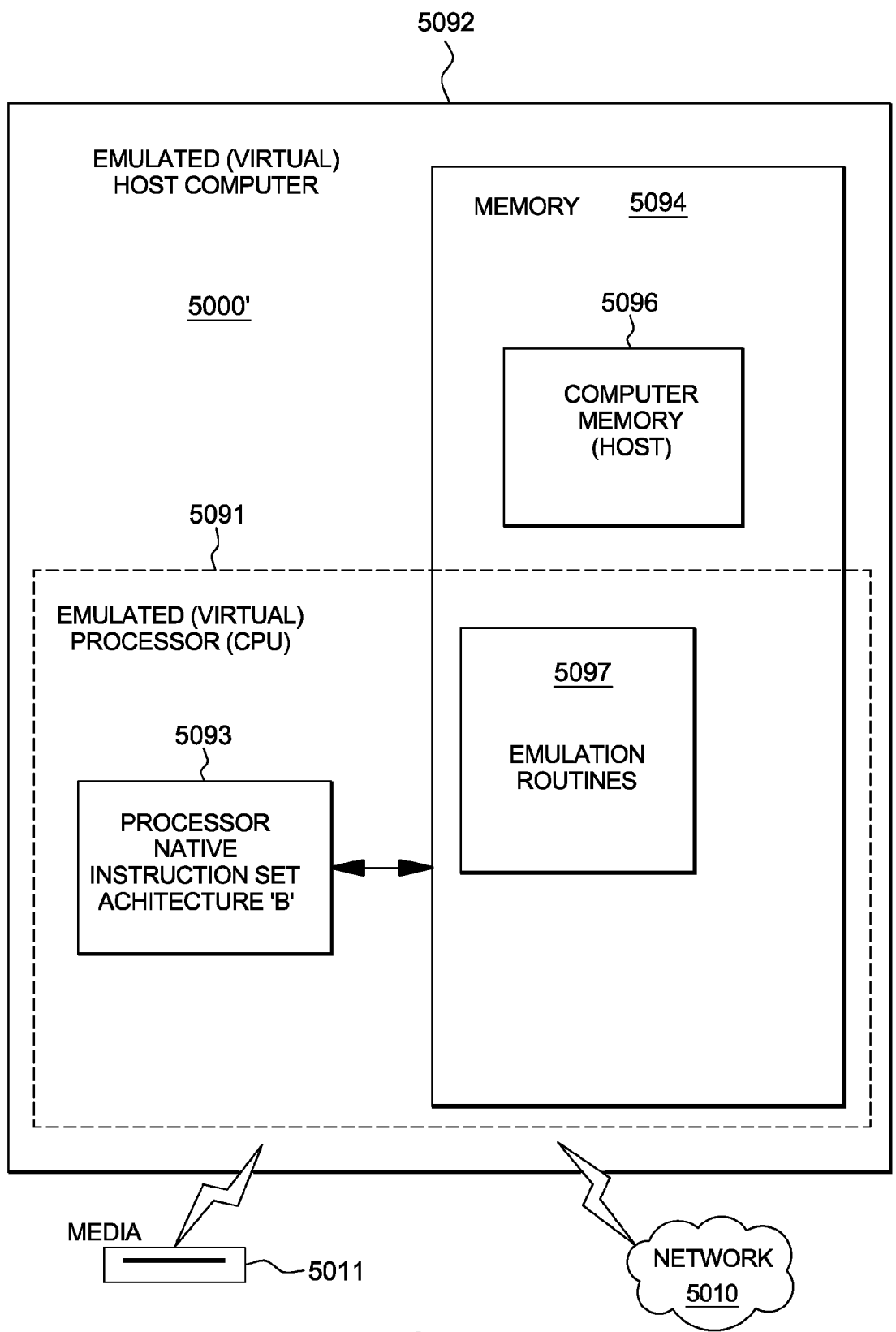
FIG. 13 depicts one embodiment of an emulated host computer system to incorporate and use one or more aspects of the present invention.

In FIG. 13, an example of an emulated host computer system 5092 is provided that emulates a host computer system 5000' of a host architecture. In the emulated host computer system 5092, the host processor (CPU) 5091 is an emulated host processor (or virtual host processor) and comprises an emulation processor 5093 having a different native instruction set architecture than that of the processor 5091 of the host computer 5000'. The emulated host computer system 5092 has memory 5094 accessible to the emulation processor 5093. In the example embodiment, the memory 5094 is partitioned into a host computer memory 5096 portion and an emulation routines 5097 portion. The host computer memory 5096 is available to programs of the emulated host computer 5092 according to host computer architecture. The emulation processor 5093 executes native instructions of an architected instruction set of an architecture other than that of the emulated processor 5091, the native instructions obtained from emulation routines memory 5097, and may access a host instruction for execution from a program in host computer memory 5096 by employing one or more instruction(s) obtained in a sequence & access/decode routine which may decode the host instruction(s) accessed to determine a native instruction execution routine for emulating the function of the host instruction accessed. Other facilities that are defined for the host computer system 5000' architecture may be emulated by architected facilities routines, including such facilities as general purpose registers, control registers, dynamic address translation and I/O subsystem support and processor cache, for example. The emulation routines may also take advantage of functions available in the emulation processor 5093 (such as general registers and dynamic translation of virtual addresses) to improve performance of the emulation routines. Special hardware and off-load engines may also be provided to assist the processor 5093 in emulating the function of the host computer 5000'.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A computer program product for executing a machine instruction, the computer program product comprising:
    a non-transitory computer readable storage medium readable by a processing circuit and storing instructions for execution by the processing circuit for performing a method comprising:
        obtaining, by a processor, a machine instruction for execution, the machine instruction being defined for computer execution according to a computer architecture, the machine instruction comprising:
            at least one opcode field for specifying an opcode, the opcode defining a branch operation, wherein the machine instruction is a branch machine instruction;
            at least one field for determining a target location in which to branch; and
            a type indication to specify a type of the branch operation, wherein the type indication specifies how the branch operation is to be processed in this execution of the machine instruction, wherein in another execution of the same branch operation it is processed differently, and wherein the type indication is configured to specify the following types of execution: a minor branch in which the machine instruction is executed in a first stream of processing and the branch operation does not cause a second stream of processing to be started, a major branch open in which the machine instruction is executed in the first stream of processing and the branch operation causes the second stream of processing to be started, and a major branch close in which processing of the first stream of processing meets up with processing of the second stream of processing; and
    executing the branch machine instruction, the executing being based on the type indication specifying the major branch open, the branch machine instruction being executed in the first stream of processing, the executing comprising:
        starting the second stream of processing, the second stream of processing having a relationship with the first stream of processing and sharing hardware resources of the first stream of processing, wherein architectural state of the first stream of processing is referenced by the second stream of processing;
        determining, based on starting the second stream of processing, whether a transaction is to be started for the second stream of processing, the transaction being defined as having results of instructions that are executed as part of the transaction being committed as one atomic unit, and wherein the determining comprises checking a field of the branch machine instruction to determine whether a start of the transaction is indicated;
        based on determining that the transaction is to be started, starting the transaction for the second stream of processing, the transaction to include one or more instructions beginning at the target location defined using the at least one field of the branch machine instruction, the one or more instructions being out of sequential execution order from one or more instructions being processed by the first stream of processing, the first stream of processing continuing to process one or more instructions subsequent to the branch machine instruction, and wherein results of the one or more instructions of the second stream of processing executed as part of the transaction are committed as one atomic unit, and wherein the transaction does not end until the first stream of processing reaches a predefined point in processing and the second stream of processing is to become the first stream of processing;
        wherein execution of the second stream of processing is speculative in that at least one instruction of the one or more instructions of the second stream of processing is executed even though reaching the at least one instruction of the second stream of processing by processing of the first stream is tentative; and
    obtaining by the processor another machine instruction, the other machine instruction having the type indication, the type indication of the other machine instruction specifying the major branch close indicating processing of the first stream of processing has caught up with the target of the major branch open, and wherein execution of the major branch close comprises ending the transaction of the second stream of processing, making the second stream of processing the first stream of processing, and updating state to reflect the transaction.

2. The computer program product of claim 1, wherein the field of the branch machine instruction used to determine whether the transaction is to be started is one of the following: the opcode, a part of the opcode, and a field separate from the opcode.

3. The computer program product of claim 1, wherein the determining comprises:
  determining, by hardware, whether the transaction is to be started; and
  wherein the starting the transaction is based on the determining by hardware indicating that the transaction is to be started.

4. The computer program product of claim 3, wherein the determining by hardware overrides the field of the branch machine instruction indicating whether the transaction is to be started.

5. The computer program product of claim 1, wherein at least one instruction of the one or more instructions processed in the second stream of processing is processed, at least in part, in parallel to one or more instructions executed in the first stream of processing.

6. The computer program product of claim 1, wherein the first stream of processing is deallocated subsequent to the first stream of processing reaching an instruction having a target location of an instruction of the second stream of processing.

7. The computer program product of claim 6, wherein the instruction reached by the first stream of processing is the major branch close instruction.

8. The computer program product of claim 1, wherein the at least one instruction of the one or more instructions of the second stream of processing is decoded and dispatched out-of-order with respect to at least one instruction of the first stream of processing.

9. The computer program product of claim 8, wherein the at least one instruction of the one or more instructions of the second stream of processing is also executed out-of-order with respect to at least one instruction of the first stream of processing.

10. A computer system for executing a machine instruction, the computer system comprising:
  a memory; and
  a processor in communications with the memory, wherein the computer system is configured to perform a method, said method comprising:
    obtaining, by the processor, a machine instruction for execution, the machine instruction being defined for computer execution according to a computer architecture, the machine instruction comprising:
      at least one opcode field for specifying an opcode, the opcode defining a branch operation, wherein the machine instruction is a branch machine instruction;
      at least one field for determining a target location in which to branch; and
      a type indication to specify a type of the branch operation, wherein the type indication specifies how the branch operation is to be processed in this execution of the machine instruction, wherein in another execution of the same branch operation it is processed differently, and wherein the type indication is configured to specify the following types of execution: a minor branch in which the machine instruction is executed in a first stream of processing and the branch operation does not cause a second stream of processing to be started, a major branch open in which the machine instruction is executed in the first stream of processing and the branch operation causes the second stream of processing to be started, and a major branch close in which processing of the first stream of processing meets up with processing of the second stream of processing; and
    executing the branch machine instruction, the executing being based on the type indication specifying the major branch open, the branch machine instruction being executed in the first stream of processing, the executing comprising:
      starting the second stream of processing, the second stream of processing having a relationship with the first stream of processing and sharing hardware resources of the first stream of processing, wherein architectural state of the first stream of processing is referenced by the second stream of processing;
      determining, based on starting the second stream of processing, whether a transaction is to be started for the second stream of processing, the transaction being defined as having results of instructions that are executed as part of the transaction being committed as one atomic unit, and wherein the determining comprises checking a field of the branch machine instruction to determine whether a start of the transaction is indicated;
      based on determining that the transaction is to be started, starting the transaction for the second stream of processing, the transaction to include one or more instructions beginning at the target location defined using the at least one field of the branch machine instruction, the one or more instructions being out of sequential execution order from one or more instructions being processed by the first stream of processing, the first stream of processing continuing to process one or more instructions subsequent to the branch machine instruction, and wherein results of the one or more instructions of the second stream of processing executed as part of the transaction are committed as one atomic unit, and wherein the transaction does not end until the first stream of processing reaches a predefined point in processing and the second stream of processing is to become the first stream of processing;
      wherein execution of the second stream of processing is speculative in that at least one instruction of the one or more instructions of the second stream of processing is executed even though reaching the at least one instruction of the second stream of processing by processing of the first stream is tentative; and
    obtaining by the processor another machine instruction, the other machine instruction having the type indication, the type indication of the other machine instruction specifying the major branch close indicating processing of the first stream of processing has caught up with the target of the major branch open, and wherein execution of the major branch close comprises ending the transaction of the second stream of processing, making the second stream of processing the first stream of processing, and updating state to reflect the transaction.

11. The computer system of claim 10, wherein the field of the branch machine instruction used to determine whether the transaction is to be started is one of the following: the opcode, a part of the opcode, and a field separate from the opcode.

12. The computer system of claim 10, wherein the determining comprises:
  determining, by hardware, whether the transaction is to be started; and wherein the starting the transaction is based on the determining by hardware indicating that the transaction is to be started.

13. The computer system of claim 12, wherein the determining by hardware overrides the field of the branch machine instruction indicating whether the transaction is to be started.

14. The computer system of claim 10, wherein the at least one instruction of the one or more instructions of the second stream of processing is decoded and dispatched out-of-order with respect to at least one instruction of the first stream of processing.

15. The computer system of claim 14, wherein the at least one instruction of the one or more instructions of the second stream of processing is also executed out-of-order with respect to at least one instruction of the first stream of processing.

16. A computer program product for executing a machine instruction, the computer program product comprising:
    a non-transitory computer readable storage medium readable by a processing circuit and storing instructions for execution by the processing circuit for performing a method comprising:
        obtaining, by a processor, a machine instruction for execution, the machine instruction being defined for computer execution according to a computer architecture, the machine instruction comprising:
            at least one opcode field for specifying an opcode, the opcode defining a branch operation, wherein the machine instruction is a branch machine instruction;
            a type indication to specify a type of the branch operation, wherein the same branch operation is executable in a plurality of different ways depending on the type indication, wherein the type indication specifies how the branch operation is to be processed in this execution of the machine instruction, and wherein the type indication is configured to specify the following types of execution: a minor branch in which the machine instruction is executed in a first stream of processing and the branch operation does not cause a second stream of processing to be started, a major branch open in which the machine instruction is executed in the first stream of processing and the branch operation causes the second stream of processing to be started, and a major branch close in which processing of the first stream of processing meets up with processing of the second stream of processing; and
            at least one field for determining a target location in which to branch; and
        executing the branch machine instruction, the executing being based on the type indication specifying the major branch open, the branch machine instruction being executed in the first stream of processing, the executing comprising:
            starting the second stream of processing, the second stream of processing having a relationship with the first stream of processing and sharing hardware resources of the first stream of processing, wherein architectural state of the first stream of processing is referenced by the second stream of processing;
            determining, based on starting the second stream of processing, whether a transaction is to be started for the second stream of processing, the transaction being defined as having results of instructions that are executed as part of the transaction being committed as one atomic unit, and wherein the determining comprises checking a field of the branch machine instruction to determine whether a start of the transaction is indicated;
            based on determining that the transaction is to be started, starting the transaction for the second stream of processing, the transaction to include one or more instructions beginning at the target location defined using the at least one field of the branch machine instruction, the one or more instructions being out of sequential execution order from one or more instructions being processed by the first stream of processing, the first stream of processing continuing to process one or more instructions subsequent to the branch machine instruction, and wherein results of the one or more instructions of the second stream of processing executed as part of the transaction are committed as one atomic unit, and wherein the transaction does not end until the first stream of processing reaches a predefined point in processing and the second stream of processing is to become the first stream of processing; and
        wherein execution of the second stream of processing is speculative in that at least one instruction of the one or more instructions of the second stream of processing is executed even though reaching the at least one instruction of the second stream of processing by processing of the first stream is tentative.

* * * * *